US012574898B2

(12) United States Patent
Su et al.

(10) Patent No.: US 12,574,898 B2
(45) Date of Patent: Mar. 10, 2026

(54) COMMUNICATION METHOD AND TERMINAL APPARATUS

(71) Applicant: HUAWEI TECHNOLOGIES CO., LTD., Guangdong (CN)

(72) Inventors: Hongjia Su, Shanghai (CN); Wenting Guo, Shanghai (CN); Jinfang Zhang, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1122 days.

(21) Appl. No.: 17/513,561

(22) Filed: Oct. 28, 2021

(65) Prior Publication Data

US 2022/0078760 A1 Mar. 10, 2022

Related U.S. Application Data

(63) Continuation of application No. PCT/CN2020/087059, filed on Apr. 26, 2020.

(30) Foreign Application Priority Data

Apr. 30, 2019 (CN) .......................... 201910364463.9
Aug. 15, 2019 (CN) .......................... 201910753309.0

(51) Int. Cl.
 *H04W 72/02* (2009.01)
 *H04W 72/0446* (2023.01)
 (Continued)

(52) U.S. Cl.
 CPC ....... *H04W 72/02* (2013.01); *H04W 72/0446* (2013.01); *H04W 72/0453* (2013.01); *H04W 72/20* (2023.01)

(58) Field of Classification Search
 CPC ............. H04W 72/02; H04W 72/0446; H04W 72/0453; H04W 72/20; H04W 72/23; H04W 72/53
 See application file for complete search history.

(56) References Cited

U.S. PATENT DOCUMENTS

2017/0230996 A1 8/2017 Li et al.
2017/0273077 A1* 9/2017 Kim ...................... H04W 76/14
 (Continued)

FOREIGN PATENT DOCUMENTS

CN 106211177 A 12/2016
CN 108811125 A 11/2018
 (Continued)

OTHER PUBLICATIONS

Huawei et al., "Ad hoc minues for V2X/V2V RRM and demodulation," 3GPP TSG-RAN WG4 Meeting #82, R4-1702317, Athens, Greece, Feb. 13-17, 2016, 24 pages.
 (Continued)

*Primary Examiner* — Kibrom T Hailu
(74) *Attorney, Agent, or Firm* — Fish & Richardson P.C.

(57) ABSTRACT

This application provides example communication methods and example terminal apparatuses. One example method includes obtaining, by a first terminal apparatus, resource pool configuration information, where the resource pool configuration information includes information about a physical sidelink control channel (PSCCH) time domain resource. The first terminal apparatus can then determine a PSCCH frequency domain resource based on the resource pool configuration information and a format of control information. The first terminal apparatus can then send the control information to a second terminal apparatus, where the control information is carried on a PSCCH time-frequency resource, and where the PSCCH time-frequency resource includes the PSCCH time domain resource and the PSCCH frequency domain resource.

20 Claims, 7 Drawing Sheets

(51) Int. Cl.
H04W 72/0453 (2023.01)
H04W 72/20 (2023.01)

(56) References Cited

U.S. PATENT DOCUMENTS

| | | | | |
|---|---|---|---|---|
| 2017/0295601 | A1* | 10/2017 | Kim | H04W 72/20 |
| 2018/0160460 | A1* | 6/2018 | Zhang | H04W 72/20 |
| 2020/0383088 | A1* | 12/2020 | Min | H04W 72/0446 |

FOREIGN PATENT DOCUMENTS

| | | | |
|---|---|---|---|
| CN | 109219131 | A | 1/2019 |
| EP | 3324695 | A1 | 5/2018 |
| WO | 2016028126 | A1 | 2/2016 |
| WO | 2016045443 | A1 | 3/2016 |
| WO | 2019061422 | A1 | 4/2019 |

OTHER PUBLICATIONS

Ericsson, "On Scheduling Assignments and Receiver Behaviour," 3GPP TSG-RAN WG1 Meeting #76bis, R1-141391, Shenzhen, China, Mar. 31-Apr. 4, 2014, 6 pages.

Extended European Search Report issued in European Application No. 20799177.9 on May 13, 2022, 13 pages.

NTT Docomo, "Discussion on Resource Control and Selection for PCS based V2V Communications," 3GPP TSG RAN WG1 Meeting #84, R1-161049, St Julian's, Malta, Feb. 15-19, 2016, 5 pages.

Huawei, HiSilicon, "Sidelink physical layer structure for NR V2X," 3GPP TSG RAN WG1 Meeting #96bis, R1-1903943, Xi'an, China, Apr. 8-12, 2019, 17 pages.

PCT International Search Report and Written Opinion issued in International Application No. PCT/CN2020/087059 on Jul. 16, 2020, 15 pages (with English translation).

* cited by examiner

COMMUNICATION METHOD AND TERMINAL APPARATUS

CROSS-REFERENCE TO RELATED APPLICATIONS

This application is a continuation of International Application No. PCT/CN2020/087059, filed on Apr. 26, 2020, which claims priority to Chinese Patent Application No. 201910364463.9, filed on Apr. 30, 2019 and Chinese Patent Application No. 201910753309.0, filed on Aug. 15, 2019. The disclosures of the aforementioned applications are hereby incorporated by reference in their entireties.

TECHNICAL FIELD

This application relates to the field of communication technologies, and in particular, to a communication method and a terminal apparatus.

BACKGROUND

Vehicle-to-everything (vehicle-to-everything, V2X) means that a vehicle can communicate with an external device. For example, through communication between vehicles, between a vehicle and a base station, and between a vehicle and a pedestrian, the vehicle can better obtain various traffic information such as a real-time road condition, road information, and pedestrian information. Therefore, driving safety and traffic efficiency are improved.

Currently, in vehicle-to-everything (vehicle-to-everything, V2X) communication based on long term evolution (long term evolution, LTE), a physical sidelink control channel (physical sidelink control channel, PSCCH) may be used to carry control information, and a physical sidelink shared channel (physical sidelink shared channel, PSSCH) may be used to carry data.

In LTE-V2X, a time-frequency resource of the PSCCH is fixed, that is, a transmit end sends the control information on the fixed PSCCH time-frequency resource. However, compared with LTE-V2X, in a new radio (new radio, NR) V2X system, services of a terminal are more abundant, and a fixed PSCCH time-frequency resource cannot meet a service requirement. Therefore, how to flexibly configure a PSCCH time-frequency resource is a technical problem to be resolved.

SUMMARY

This application provides a communication method and a terminal apparatus. The method helps flexibly configure a PSCCH time-frequency resource.

According to a first aspect, an embodiment of this application provides a communication method. The method may be performed by a first terminal apparatus. The method includes: The first terminal apparatus obtains resource pool configuration information, where the resource pool configuration information includes information about a physical sidelink control channel (PSCCH) time domain resource. The first terminal apparatus determines a PSCCH frequency domain resource based on the resource pool configuration information and a format of to-be-sent control information. The first terminal apparatus sends the control information to a second terminal apparatus, where the control information is carried on a PSCCH time-frequency resource, and the PSCCH time-frequency resource includes the PSCCH time domain resource and the PSCCH frequency domain resource.

In this embodiment of this application, the PSCCH time-frequency resource is not fixed, and the first terminal apparatus may determine the PSCCH frequency domain resource based on the format of the to-be-sent control information and the PSCCH time domain resource. In other words, the first terminal apparatus may flexibly configure the PSCCH time-frequency resource. In this embodiment of this application, flexibility of the PSCCH time-frequency resource can be improved. For example, different services may correspond to different formats of control information. In this case, different PSCCH time-frequency resources may be used for different services.

In a possible design, the PSCCH time domain resource includes three consecutive symbols, and content included in the control information corresponding to the format of the control information is greater than or greater than or equal to 50 bits and less than or less than or equal to 60 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to eight resource blocks (RBs).

In this embodiment of this application, when the PSCCH time domain resource in the resource pool configuration information is three consecutive symbols, if the format of the control information is 50 bits to 60 bits, the PSCCH frequency domain resource is frequency domain bandwidth corresponding to eight RBs.

In a possible design, the PSCCH time domain resource includes three consecutive symbols, and content included in the control information corresponding to the format of the control information is greater than or greater than or equal to 80 bits and less than or less than or equal to 95 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to 12 RBs.

In this embodiment of this application, when the PSCCH time domain resource in the resource pool configuration information is three consecutive symbols, if the format of the control information is 80 bits to 95 bits, the PSCCH frequency domain resource is frequency domain bandwidth corresponding to 12 RBs.

In a possible design, the PSCCH time domain resource includes three consecutive symbols, and content included in the control information corresponding to the format of the control information is greater than or greater than or equal to 110 bits and less than or less than or equal to 125 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to 18 RBs.

In this embodiment of this application, when the PSCCH time domain resource in the resource pool configuration information is three consecutive symbols, if the format of the control information is 110 bits to 125 bits, the PSCCH frequency domain resource is frequency domain bandwidth corresponding to 18 RBs.

In a possible design, the PSCCH time domain resource includes two consecutive symbols, and content included in the control information corresponding to the format of the control information is greater than or greater than or equal to 50 bits and less than or less than or equal to 60 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to 12 RBs.

In this embodiment of this application, when the PSCCH time domain resource in the resource pool configuration information is two consecutive symbols, if the format of the control information is 50 bits to 60 bits, the PSCCH frequency domain resource is frequency domain bandwidth corresponding to 12 RBs.

In a possible design, the PSCCH time domain resource includes two consecutive symbols, and content included in the control information corresponding to the format of the control information is greater than or greater than or equal to 80 bits and less than or less than or equal to 95 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to 18 RBs.

In this embodiment of this application, when the PSCCH time domain resource in the resource pool configuration information is two consecutive symbols, if the format of the control information is 80 bits to 95 bits, the PSCCH frequency domain resource is frequency domain bandwidth corresponding to 18 RBs.

In a possible design, the PSCCH time domain resource includes two consecutive symbols, and content included in the control information corresponding to the format of the control information is greater than or greater than or equal to 110 bits and less than or less than or equal to 125 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to 26 RBs.

In this embodiment of this application, when the PSCCH time domain resource in the resource pool configuration information is two consecutive symbols, if the format of the control information is 110 bits to 125 bits, the PSCCH frequency domain resource is frequency domain bandwidth corresponding to 26 RBs.

In a possible design, the PSCCH time domain resource is all symbols that are in one slot and that are used for sidelink communication, and content included in the control information corresponding to the format of the control information is greater than or greater than or equal to 50 bits and less than or less than or equal to 60 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to two RBs.

In this embodiment of this application, when the PSCCH time domain resource in the resource pool configuration information is all symbols that are in one slot and that are used for sidelink communication, if the format of the control information is 50 bits to 60 bits, the PSCCH frequency domain resource is frequency domain bandwidth corresponding to two RBs.

In a possible design, the PSCCH time domain resource is all symbols that are in one slot and that can be used for sidelink communication, and a size of content included in the control information corresponding to the format of the control information is greater than or greater than or equal to 80 bits and less than or less than or equal to 95 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to three RBs.

In this embodiment of this application, when the PSCCH time domain resource in the resource pool configuration information is all symbols that are in one slot and that are used for sidelink communication, if the format of the control information is 80 bits to 95 bits, the PSCCH frequency domain resource is frequency domain bandwidth corresponding to three RBs.

In a possible design, the PSCCH time domain resource is all symbols that are in one slot and that can be used for sidelink communication, and a size of content included in the control information corresponding to the format of the control information is greater than or greater than or equal to 110 bits and less than or less than or equal to 125 bits. That the first terminal apparatus determines a PSCCH frequency domain resource based on the resource pool configuration information and a format of to-be-sent control information includes: The first terminal apparatus determines, based on the resource pool configuration information and the format of the control information, that the PSCCH frequency domain resource is frequency domain bandwidth corresponding to five RBs.

In this embodiment of this application, when the PSCCH time domain resource in the resource pool configuration information is all symbols that are in one slot and that are used for sidelink communication, if the format of the control information is 110 bits to 125 bits, the PSCCH frequency domain resource is frequency domain bandwidth corresponding to five RBs.

In a possible design, the resource pool configuration information is received from a network device or is preconfigured.

In a possible design, the content included in the control information includes cyclic redundancy check data.

According to a second aspect, an embodiment of this application further provides a communication method. The method may be performed by a second terminal apparatus. The method includes: The second terminal apparatus obtains resource pool configuration information, where the resource pool configuration information includes information about a physical sidelink control channel (PSCCH) time domain resource. The second terminal apparatus determines a first PSCCH frequency domain resource. The second terminal apparatus receives control information from a first terminal apparatus on a first PSCCH time-frequency resource, where the first PSCCH time-frequency resource includes the PSCCH time domain resource and the first PSCCH frequency domain resource. If the second terminal apparatus does not receive the control information from the first terminal apparatus on the first PSCCH time-frequency resource, the second terminal apparatus determines a second PSCCH frequency domain resource. The second terminal apparatus receives the control information from the first terminal apparatus on a second PSCCH time-frequency resource, where the second PSCCH time-frequency resource includes the PSCCH time domain resource and the second PSCCH frequency domain resource.

In this embodiment of this application, the resource pool configuration information obtained by the second terminal apparatus already includes the PSCCH time domain resource. Therefore, when performing blind detection on the control information, the second terminal apparatus only needs to change a frequency domain resource, and does not need to change a time resource.

In a possible design, the PSCCH time domain resource includes three consecutive symbols, the first PSCCH frequency domain resource is frequency domain bandwidth corresponding to eight RBs, and the second PSCCH frequency domain resource is frequency domain bandwidth corresponding to 12 RBs or 18 RBs; the PSCCH time domain resource includes three consecutive symbols, the first PSCCH frequency domain resource is frequency domain bandwidth corresponding to 12 RBs, and the second PSCCH frequency domain resource is frequency domain bandwidth corresponding to eight RBs or 18 RBs; or the PSCCH time domain resource includes three consecutive symbols, the first PSCCH frequency domain resource is frequency domain bandwidth corresponding to 18 RBs, and the second PSCCH frequency domain resource is frequency domain bandwidth corresponding to eight RBs or 12 RBs.

In a possible design, the PSCCH time domain resource includes two consecutive symbols, the first PSCCH frequency domain resource is frequency domain bandwidth corresponding to 12 RBs, and the second PSCCH frequency domain resource is frequency domain bandwidth corresponding to 18 RBs or 26 RBs; the PSCCH time domain resource includes two consecutive symbols, the first PSCCH frequency domain resource is frequency domain bandwidth corresponding to 18 RBs, and the second PSCCH frequency domain resource is frequency domain bandwidth corresponding to 12 RBs or 26 RBs; or the PSCCH time domain resource includes two consecutive symbols, the first PSCCH frequency domain resource is frequency domain bandwidth corresponding to 26 RBs, and the second PSCCH frequency domain resource is frequency domain bandwidth corresponding to 12 RBs or 18 RBs.

In a possible design, the PSCCH time domain resource includes all symbols that are in one slot and that can be used for sidelink communication, the first PSCCH frequency domain resource is frequency domain bandwidth corresponding to two RBs, and the second PSCCH frequency domain resource is frequency domain bandwidth corresponding to three RBs or five RBs; the PSCCH time domain resource includes all symbols that are in one slot and that can be used for sidelink communication, the first PSCCH frequency domain resource is frequency domain bandwidth corresponding to three RBs, and the second PSCCH frequency domain resource is frequency domain bandwidth corresponding to two RBs or five RBs; or the PSCCH time domain resource includes all symbols that are in one slot and that can be used for sidelink communication, the first PSCCH frequency domain resource is frequency domain bandwidth corresponding to five RBs, and the second PSCCH frequency domain resource is frequency domain bandwidth corresponding to two RBs or three RBs.

According to a third aspect, an embodiment of this application further provides a communication method. The method is performed by a first terminal apparatus. The method includes: The first terminal apparatus obtains resource pool configuration information, where the resource pool configuration information includes information about a physical sidelink control channel (PSCCH) time domain resource. The first terminal apparatus determines to-be-sent first control information and second control information, where the second control information is second-stage control information of the first control information. The first terminal apparatus determines an aggregation level granularity of the second control information based on the PSCCH time domain resource, where the aggregation level granularity is used to indicate a time-frequency resource including the PSCCH time domain resource and frequency domain bandwidth corresponding to one resource block (RB). The first terminal apparatus sends the first control information and the second control information to a second terminal apparatus, where the first control information includes first indication information, the first indication information is used to indicate at least one aggregation level granularity, and the at least one aggregation level granularity is used by the second terminal apparatus to receive the second control information.

In this embodiment of this application, the aggregation level granularity includes the PSCCH time domain resource in the resource pool configuration information and the frequency domain bandwidth corresponding to one RB. The first terminal apparatus may determine the first-stage control information and the second-stage control information. The first-stage control information sent by the first terminal apparatus to the second terminal apparatus includes the first indication information, and the first indication information is used to indicate the at least one aggregation level granularity used by the second terminal apparatus to receive the second control information.

In a possible design, before the first terminal apparatus sends the first control information and the second control information to the second terminal apparatus, the first terminal apparatus determines the at least one aggregation level granularity based on the resource pool configuration information and channel quality of a sidelink between the first terminal apparatus and the second terminal apparatus.

In this embodiment of this application, the first terminal apparatus determines the at least one aggregation level granularity based on the channel quality of the sidelink between the first terminal apparatus and the second terminal apparatus. For example, when the channel quality of the sidelink between the first terminal apparatus and the second terminal apparatus is relatively good, it is determined that a quantity of aggregation level granularities is relatively small, that is, a quantity of PSCCH time-frequency resources is relatively small, which helps save resources; when the channel quality of the sidelink between the first terminal apparatus and the second terminal apparatus is relatively poor, it is determined that a quantity of aggregation level granularities is relatively large, that is, a quantity of PSCCH time domain resources is relatively large, which ensures accurate transmission of the control information.

In a possible design, the resource pool configuration information is received from a network device or is preconfigured.

According to a fourth aspect, an embodiment of this application further provides a communication method. The method may be performed by a second terminal apparatus. The method includes: The second terminal apparatus receives first control information from a first terminal apparatus, where the first control information includes first indication information, the first indication information is used to indicate at least one aggregation level granularity, and each of the at least one aggregation level granularity is used to indicate a time-frequency resource including a physical sidelink control channel (PSCCH) time domain resource and frequency domain bandwidth corresponding to one resource block (RB). The second terminal apparatus receives second control information from the first terminal apparatus on the time-frequency resource indicated by the at least one aggregation level granularity.

In this embodiment of this application, after receiving the first control information from the first terminal apparatus, the second terminal apparatus may receive the second control information on the time-frequency resource indicated by the at least one aggregation level granularity in the first control information. In this manner, the second terminal apparatus does not need to perform blind detection on the control information, thereby improving communication efficiency.

In a possible design, the resource pool configuration information is received from a network device or is preconfigured.

According to a fifth aspect, an embodiment of this application further provides a terminal apparatus. The terminal apparatus has a function of implementing behavior of the first terminal apparatus in the method example in the first aspect. The function may be implemented by hardware, or may be implemented by hardware executing corresponding software. The hardware or the software includes one or more modules corresponding to the foregoing function. In a possible design, a structure of the apparatus includes a processing unit and a sending unit. The units may perform corresponding functions in the method example in the first aspect. For details, refer to the detailed descriptions in the method example. Details are not described herein again.

According to a sixth aspect, an embodiment of this application further provides a terminal apparatus. The terminal apparatus has a function of implementing behavior of the second terminal apparatus in the method example in the second aspect. The function may be implemented by hardware, or may be implemented by hardware executing corresponding software. The hardware or the software includes one or more modules corresponding to the foregoing function. In a possible design, a structure of the apparatus includes a processing unit and a receiving unit. The units may perform corresponding functions in the method example in the second aspect. For details, refer to the detailed descriptions in the method example. Details are not described herein again.

According to a seventh aspect, an embodiment of this application further provides a terminal apparatus. The terminal apparatus has a function of implementing behavior of the first terminal apparatus in the method example in the third aspect. The function may be implemented by hardware, or may be implemented by hardware executing corresponding software. The hardware or the software includes one or more modules corresponding to the foregoing function. In a possible design, a structure of the apparatus includes a processing unit and a sending unit. The units may perform corresponding functions in the method example in the third aspect. For details, refer to the detailed descriptions in the method example. Details are not described herein again.

According to an eighth aspect, an embodiment of this application further provides a terminal apparatus. The terminal apparatus has a function of implementing behavior of the second terminal apparatus in the method example in the fourth aspect. The function may be implemented by hardware, or may be implemented by hardware executing corresponding software. The hardware or the software includes one or more modules corresponding to the foregoing function. In a possible design, a structure of the apparatus includes a receiving unit. The unit may perform corresponding functions in the method example in the fourth aspect. For details, refer to the detailed descriptions in the method example. Details are not described herein again.

According to a ninth aspect, an embodiment of this application further provides a terminal apparatus. A structure of the terminal apparatus includes a processor and a memory, and the processor is configured to support the terminal apparatus in performing corresponding functions in the method provided in the first aspect or the third aspect. The memory is coupled to the processor and stores program instructions and data that are necessary for the communication apparatus. The structure of the communication apparatus further includes a communication interface, configured to communicate with another device.

According to a tenth aspect, an embodiment of this application further provides a terminal apparatus. A structure of the terminal apparatus includes a processor and a memory, and the processor is configured to support the terminal apparatus in performing corresponding functions in the method provided in the second aspect or the fourth aspect. The memory is coupled to the processor and stores program instructions and data that are necessary for the communication apparatus. The structure of the communication apparatus further includes a communication interface, configured to communicate with another device.

According to an eleventh aspect, this application further provides a computer-readable storage medium. The computer-readable storage medium stores instructions. When the instructions are run on a computer, the computer is enabled to perform all or some of the steps of the methods provided in the first aspect to the fourth aspect.

According to a twelfth aspect, this application further provides a computer program product including instructions. When the computer program product runs on a computer, the computer is enabled to perform all or some of the steps of the methods provided in the first aspect to the fourth aspect.

According to a thirteenth aspect, this application further provides a communication apparatus such as a chip system. The communication apparatus may be used in a terminal apparatus; is connected to a memory; and is configured to read and execute a software program stored in the memory, to perform all or some of the steps of the methods provided in the first aspect to the fourth aspect.

According to a fourteenth aspect, this application further provides a communication method. The method may be performed by a first terminal apparatus. The method includes: The first terminal apparatus obtains resource pool configuration information, where the resource pool configuration information is used to indicate a size of a physical sidelink control channel (PSCCH) time domain resource and a size of a PSCCH frequency domain resource. The first terminal apparatus determines a PSCCH time-frequency resource based on the resource pool configuration information. The first terminal apparatus sends control information to a second terminal apparatus on the PSCCH time-frequency resource.

In this embodiment of this application, the size of the PSCCH time domain resource and the size of the PSCCH frequency domain resource may be preconfigured in the resource pool configuration information. When sending the control information to the second terminal apparatus, the first terminal apparatus only needs to determine the PSCCH time-frequency resource in the resource pool configuration information. Because the first terminal apparatus and the second terminal apparatus share the resource pool configuration information, the second terminal apparatus may determine, in the resource pool configuration information, the PSCCH time-frequency resource for receiving the control information, and does not need to perform blind detection.

In a possible design, the resource pool configuration information includes a first resource format index, and the first resource format index is used to indicate the size of the PSCCH time domain resource and the size of the PSCCH frequency domain resource. That the first terminal apparatus determines a PSCCH time-frequency resource based on the resource pool configuration information includes: The first terminal apparatus determines a first resource format in at least one resource format based on the first resource format index, where the first resource format is a combination of a size of a PSCCH time domain resource and a size of a PSCCH frequency domain resource.

In this embodiment of this application, the resource pool configuration information may include the first resource format index (index). When sending the control information, the first terminal apparatus determines a corresponding resource format based on the index, where the resource format is a combination of a size of a PSCCH time domain resource and a size of a PSCCH frequency domain resource; and then sends the control information on a PSCCH time-frequency resource corresponding to the determined resource format.

In a possible design, the first terminal apparatus may further maintain a mapping between at least one resource format index and the at least one resource format, where the at least one resource format index includes the first resource format index.

It should be understood that the first terminal apparatus may maintain the mapping between the at least one resource format index and the at least one resource format. For example, the first terminal apparatus may update the mapping. For example, the first terminal apparatus may receive, in real time, resource pool configuration information (including a new resource format index) newly configured by a network side device, and then update the mapping based on the new resource format index.

In a possible design, the at least one resource format includes one or more of the following resource formats:

a size of a PSCCH frequency domain resource is eight RBs and a size of a PSCCH time domain resource is three consecutive symbols; a size of a PSCCH frequency domain resource is 10 RBs and a size of a PSCCH time domain resource is three consecutive symbols; a size of a PSCCH frequency domain resource is 12 RBs and a size of a PSCCH time domain resource is three consecutive symbols; a size of a PSCCH frequency domain resource is 12 RBs and a size of a PSCCH time domain resource is two consecutive symbols; a size of a PSCCH frequency domain resource is 15 RBs and a size of a PSCCH time domain resource is two consecutive symbols; a size of a PSCCH frequency domain resource is 18 RBs and a size of a PSCCH time domain resource is two consecutive symbols; a size of a PSCCH frequency domain resource is three RBs and a size of a PSCCH time domain resource is eight consecutive symbols; a size of a PSCCH frequency domain resource is three RBs and a size of a PSCCH time domain resource is eight consecutive symbols; a size of a PSCCH frequency domain resource is four RBs and a size of a PSCCH time domain resource is eight consecutive symbols; a size of a PSCCH frequency domain resource is three RBs and a size of a PSCCH time domain resource is nine consecutive symbols; a size of a PSCCH frequency domain resource is four RBs and a size of a PSCCH time domain resource is nine consecutive symbols; a size of a PSCCH frequency domain resource is four RBs and a size of a PSCCH time domain resource is nine consecutive symbols; a size of a PSCCH frequency domain resource is three RBs and a size of a PSCCH time domain resource is 10 consecutive symbols; a size of a PSCCH frequency domain resource is three RBs and a size of a PSCCH time domain resource is 10 consecutive symbols; a size of a PSCCH frequency domain resource is four RBs and a size of a PSCCH time domain resource is 10 consecutive symbols; a size of a PSCCH frequency domain resource is two RBs and a size of a PSCCH time domain resource is 11 or 12 consecutive symbols; a size of a PSCCH frequency domain resource is three RBs and a size of a PSCCH time domain resource is 11 or 12 consecutive symbols; or a size of a PSCCH frequency domain resource is three RBs and a size of a PSCCH time domain resource is 11 or 12 consecutive symbols.

According to a fifteenth aspect, an embodiment of this application further provides a terminal apparatus. The terminal apparatus has a function of implementing behavior of the first terminal apparatus in the method example in the fourteenth aspect. The function may be implemented by hardware, or may be implemented by hardware executing corresponding software. The hardware or the software includes one or more modules corresponding to the foregoing function. In a possible design, a structure of the apparatus includes a processing unit and a sending unit. The units may perform corresponding functions in the method example in the first aspect. For details, refer to the detailed descriptions in the method example. Details are not described herein again.

According to a sixteenth aspect, an embodiment of this application further provides a terminal apparatus. A structure of the terminal apparatus includes a processor and a memory, and the processor is configured to support the terminal apparatus in performing corresponding functions in the method provided in the fourteenth aspect. The memory is coupled to the processor and stores program instructions and data that are necessary for the communication apparatus. The structure of the communication apparatus further includes a communication interface, configured to communicate with another device.

According to a seventeenth aspect, an embodiment of this application further provides a terminal apparatus. A structure of the terminal apparatus includes a processor and a memory, and the processor is configured to support the terminal apparatus in performing corresponding functions in the method provided in the fourteenth aspect. The memory is coupled to the processor and stores program instructions and data that are necessary for the communication apparatus. The structure of the communication apparatus further includes a communication interface, configured to communicate with another device.

According to an eighteenth aspect, this application further provides a computer-readable storage medium. The computer-readable storage medium stores instructions. When the instructions are run on a computer, the computer is enabled to perform all or some of the steps of the method provided in the fourteenth aspect.

According to a nineteenth aspect, this application further provides a computer program product including instructions. When the computer program product runs on a computer, the computer is enabled to perform all or some of the steps of the method provided in the fourteenth aspect.

According to a twentieth aspect, this application further provides a communication apparatus such as a chip system. The communication apparatus may be used in a terminal apparatus; is connected to a memory; and is configured to read and execute a software program stored in the memory, to perform all or some of the steps of the method provided in the fourteenth aspect.

DESCRIPTION OF EMBODIMENTS

Figure 1:
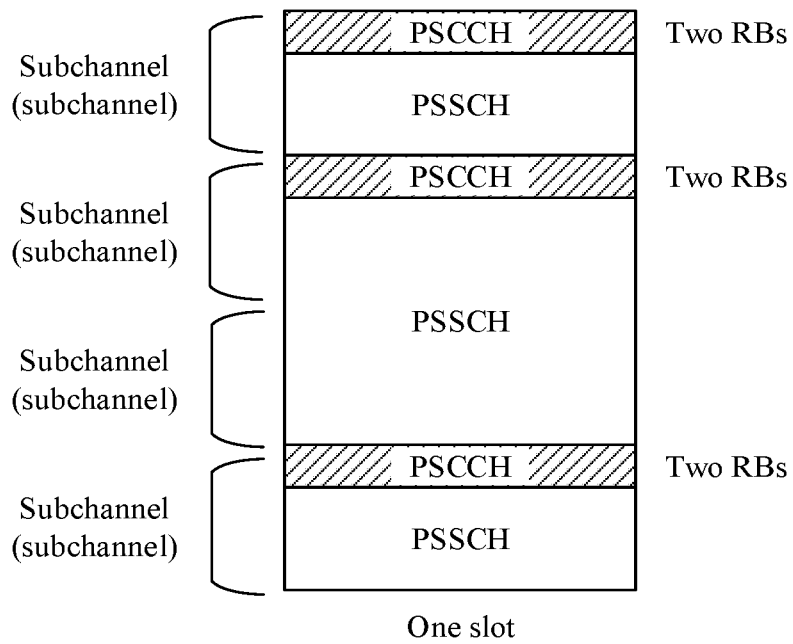
FIG. 1 is a schematic diagram of a PSCCH time-frequency resource according to an embodiment of this application.

The following describes technical solutions in embodiments of this application with reference to the accompanying drawings in the embodiments of this application.

The technical solutions in the embodiments of this application may be applied to various communication systems, for example, a wideband code division multiple access (wideband code division multiple access, WCDMA) mobile communication system, an evolved universal terrestrial radio access network (evolved universal terrestrial radio access network, E-UTRAN) system, a next generation radio access network (next generation radio access network, NG-RAN) system, a long term evolution (long term evolution, LTE) system, a worldwide interoperability for microwave access (worldwide interoperability for microwave access, WiMAX) communication system, a future 5th generation (5th Generation, 5G) system such as a new radio access technology (new radio access technology, NR) system, and a future communication system such as a 6G system.

A service scenario (or an application scenario) described in the embodiments of this application is intended to describe the technical solutions in the embodiments of this application more clearly, and do not constitute a limitation on the technical solutions provided in the embodiments of this application. A person of ordinary skill in the art may know that with emergence of a new service scenario, the technical solutions provided in the embodiments of this application are also applicable to similar technical problems.

In addition, the term "example" in the embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

In the following, some terms of the embodiments of this application are described, to help a person skilled in the art have a better understanding.

(1) Terminal (terminal): The terminal includes a device that provides a user with voice and/or data connectivity, for example, may include a handheld device with a wireless connection function, or a processing device connected to a wireless modem. The terminal may communicate with a core network by using a radio access network (radio access network, RAN) and exchange voice and/or data with the RAN. The terminal may include user equipment (user equipment, UE), a wireless terminal, a mobile terminal, a subscriber unit (subscriber unit), a subscriber station (subscriber station), a mobile station (mobile station), a mobile console (mobile), a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer having a mobile terminal, a portable, pocket-sized, handheld, computer built-in mobile apparatus, or a smart wearable device. For example, the terminal is a device such as a personal communication service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal further includes a limited device, for example, a device with relatively low power consumption, a device with a limited storage capability, or a device with a limited computing capability. For example, the terminal includes an information sensing device such as a bar code, radio frequency identification (radio frequency identification, RFID), a sensor, a global positioning system (global positioning system, GPS), or a laser scanner.

By way of example, and not limitation, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but is used to implement a powerful function through software support, data exchange, and cloud interaction. In a broad sense, wearable intelligent devices include full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the terminals described above are located in a vehicle, for example, placed in the vehicle or mounted in the vehicle, the terminals may be considered as vehicle-mounted terminals. For example, the vehicle-mounted terminals are also referred to as on-board units (on-board units, OBUs). The terminal in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application.

(2) Network device: For example, the network device includes an access network (access network, AN) device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to mutually convert a received over-the-air frame and an internet protocol (IP) packet, and serve as a router between the terminal and a rest part of the access network. The rest part of the access network may include an IP network. The RSU may be a fixed infrastructure entity supporting a V2X application, and may exchange a message with another entity supporting the V2X application. The network device may further coordinate attribute management of an air interface. For example, the network device may include an evolved NodeB (NodeB or eNB or e-NodeB, evolved NodeB) in a long term evolution (long term evolution, LTE) system or an LTE-advanced (LTE-Advanced, LTE-A) system, may include a next generation NodeB (next generation NodeB, gNB) in a 5G NR system, or may include a centralized unit (centralized unit, CU) and a distributed unit (distributed unit, DU) in a cloud access network (cloud radio access network, CloudRAN) system or a base station in any new generation system such as a 6G system. This is not limited in the embodiments of this application.

(3) Universal user to network interface (user to network interface universal, Uu): The universal user to network interface is referred to as a Uu interface for short, is also referred to as a Uu interface, and is an interface used for wireless communication between a terminal and a network device.

(4) PC-5 interface: The PC-5 interface is an interface used for wireless communication between terminals. In other words, a terminal communicates with another terminal through a PC-5 interface.

(5) Sidelink (sidelink): The sidelink may also be referred to as a sidelink, a sidelink link, or the like. The name is not limited in the embodiments of this application. In a V2X scenario, the sidelink is a direct link connection between two V2X terminals, and the V2X terminal is a terminal having a V2X function. A communication interface of the sidelink is a PC-5 interface.

(6) SL transmission: Data transmission between two V2X terminals on a sidelink is referred to as the SL transmission.

Before performing the SL transmission, the two V2X terminals may establish a sidelink connection. For example, a V2X terminal used as an initiator sends, to a network device, a request for establishing a sidelink connection. If the network device agrees with the V2X terminal on establishing the sidelink connection, the network device sends, to the V2X terminal, configuration information for establishing the sidelink connection, and the V2X terminal establishes a sidelink connection to another V2X terminal based on the configuration information sent by the network device.

(7) Resource: The resource may also be referred to as a transmission resource, and includes any one or a combination of a time domain resource, a frequency domain resource, a time-frequency resource, a space domain resource, or the like. It should be noted that the time-frequency resource in the embodiments of this application includes a time domain resource and a frequency domain resource. Specifically, the time-frequency resource is formed by the time domain resource and the frequency domain resource. For example, a PSCCH time-frequency resource is formed by a PSCCH time domain resource and a PSCCH frequency domain resource.

It should be understood that, in this specification, a resource used to send or receive information on a Uu link may be referred to as a Uu link resource, and a resource used to send or receive information on a sidelink may be referred to as an SL transmission resource.

It should be noted that after establishing a sidelink, two V2X terminals may use an SL transmission resource. The SL transmission resource may be used in a plurality of manners. For example, a network device configures the SL transmission resource for the terminal. That the network device "configures" the SL transmission resource for the terminal may be that the network device sends the SL transmission resource by using signaling. Sending the SL transmission resource by using the signaling may include sending the SL transmission resource to the terminal by using at least one of RRC signaling, MAC signaling, or physical layer signaling. For another example, the terminal may independently select the SL transmission resource. For example, the terminal may select the SL transmission resource from a preconfigured resource pool based on interference detection. Preconfiguration includes OAM configuration or presetting in the terminal.

(8) Resource pool: In LTE-V2X, the resource pool (resource pool, RP) is defined. The resource pool is a resource set including a time domain resource (including several sidelink subframes (subframes)) and a frequency domain resource (including several subchannels (subchannels), where one subchannel includes several consecutive RBs), and is used for SL transmission between two terminals. For example, a transmit end sends sidelink control information (SCI) in the resource pool, where the SCI is carried on a PSCCH. The SCI is used to schedule data, and the data is carried on a PSSCH.

Therefore, resource pool configuration information includes at least two pieces of information: time domain resource information and frequency domain resource information. The time domain resource information may include one or more time units (for example, a symbol or a slot). The frequency domain resource information includes a quantity of subchannels, and a size of each subchannel, that is, a quantity of resource blocks (resource blocks, RBs) that each subchannel includes.

It should be noted that, in the embodiments of this application, that the frequency domain resource includes several RBs means that the frequency domain resource includes frequency domain bandwidth corresponding to the several RBs. For example, one RB includes 12 subcarriers, and the frequency domain resource includes two RBs. In other words, the frequency domain resource includes 2*12=24 subcarriers. It should be noted that a quantity of subcarriers included in one RB is not limited in the embodiments of this application.

In LTE-V2X, because a physical layer supports broadcast communication, a location of a resource (that is, a PSCCH time-frequency resource) used for the sidelink control information is fixed. With reference to FIG. 1, a resource pool includes four subchannels in frequency domain, where each subchannel includes two RBs; and includes one subframe in time domain. It can be learned from the figure that a size of a PSCCH time-frequency resource in the resource pool is fixed, that is, the PSCCH time-frequency resource includes one subframe in time domain and two RBs in frequency domain.

It should be noted that, in the solutions provided in the embodiments of this application, a size of a PSCCH time-frequency resource used for sidelink control information is no longer fixed, and may be flexibly configured, so that flexibility of the PSCCH time-frequency resource is improved.

(9) Time unit: A time domain resource includes one or more time units, and the time unit may be a radio frame, a subframe, a slot, a symbol, or the like. One radio frame may include a plurality of subframes, one subframe may include one or more slots (slots), and one slot may include at least one symbol (symbol). Alternatively, one radio frame may include a plurality of slots, and one slot may include at least one symbol.

In 5G NR, a slot may include at least one of a symbol used for downlink transmission, a symbol used for flexible transmission, a symbol used for uplink transmission, and the like. In this way, compositions of the slot are referred to as different slot formats (slot formats, SFs), and there may be a maximum of 256 slot formats. Each symbol in a slot may have three states: an uplink (uplink, UL) state, a downlink (downlink, DL) state, and an unknown (unknown) state, which are denoted as UL (U)/DL (D)/X. Slots with different slot formats may include different quantities of uplink symbols, different quantities of downlink symbols, different quantities of flexible symbols, or different quantities of guard interval symbols.

Slots may have different slot types, and the different slot types include different quantities of symbols. For example, a mini slot (mini slot) includes fewer than seven symbols, and a common slot (slot) includes seven symbols or 14 symbols. Based on different subcarrier spacings, symbol lengths may be different. Therefore, slot lengths may be different.

It should be noted that the slot in the embodiments of this application may be any one of the foregoing slots.

(10) The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, understood as one, two, or more. For example, including at least one means including one, two, or more, and does not limit which items are included. For example, if at least one of A, B, and C is included, A, B, C, A and B, A and C, B and C, or A and B and C may be included. Similarly, understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects unless otherwise stated.

Unless otherwise stated, ordinal numbers such as "first" and "second" in the embodiments of this application are intended to distinguish between a plurality of objects, and are not intended to limit an order, a time sequence, priorities, or importance of the plurality of objects. For example, a first time domain resource and a second time domain resource are merely intended to distinguish between different time domain resources, but are not intended to limit priorities, importance, or the like of the two time domain resources.

The following describes an application scenario related to the embodiments of this application.

A communication method provided in the embodiments of this application may be applied to a vehicle-to-everything (vehicle-to-everything, V2X) scenario. The V2X scenario specifically includes four application scenarios: a vehicle-to-vehicle (Vehicle-to-Vehicle, V2V) scenario, a vehicle-to-pedestrian (Vehicle-to-Pedestrian, V2P) scenario, a vehicle-to-infrastructure (Vehicle-to-Infrastructure, V2I) scenario, and a vehicle-to-network (Vehicle-to-Network, V2N) scenario. V2V refers to communication between vehicles; V2P refers to communication between a vehicle and a person (including a pedestrian, a cyclist, a driver, or a passenger); V2I refers to communication between a vehicle and a roadside apparatus (an RSU); V2N refers to communication between a vehicle and a base station/network. Communication of V2V and V2P is communication that is based on a sidelink, and communication of V2I and V2N is communication that is based on a non-sidelink. The communication method provided in the embodiments of this application is applicable to communication that is based on a sidelink, that is, V2V or V2P.

Figure 2:
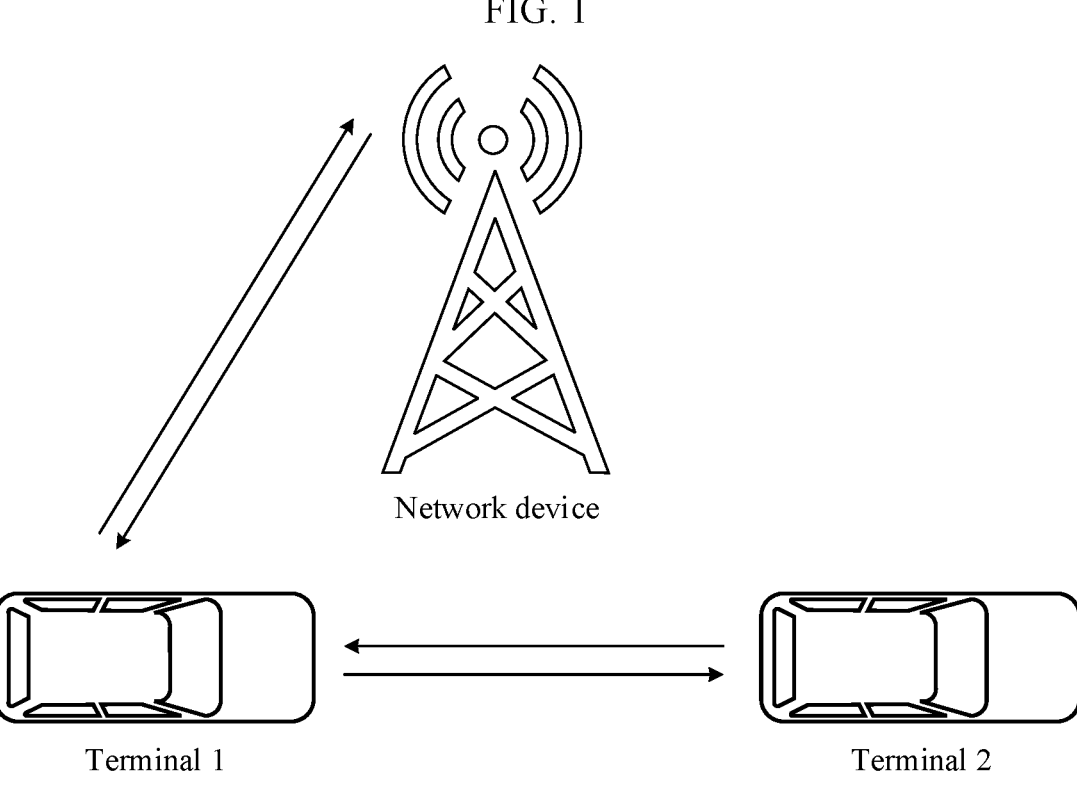
FIG. 2 is a schematic diagram of an application scenario according to an embodiment of this application.

FIG. 2 is a schematic diagram of an application scenario according to an embodiment of this application. The scenario includes a network device and two terminals, which are separately a terminal 1 and a terminal 2. Both the two terminals may be connected to the network device; or only the terminal 1 in the two terminals may be connected to the network device, and the terminal 2 is not connected to the network device; or only the terminal 2 in the two terminals may be connected to the network device, and the terminal 1 is not connected to the network device. The two terminals may communicate with each other through a sidelink. When the terminal 1 and the terminal 2 communicate with each other through the sidelink, it is assumed that the terminal 1 sends data and/or control signaling to the terminal 2, and the terminal 2 receives the data and/or control signaling sent by the terminal 1. In this application, the terminal 1 that sends the data and/or control signaling is referred to as a transmit terminal or a transmit end, and the terminal 2 that receives the data and/or control signaling is referred to as a receive terminal or a receive end.

It should be noted that a quantity of terminals in FIG. 2 is merely an example. During actual application, there may be more terminals.

In addition, the network device in FIG. 2 may be, for example, an access network device such as a base station. The access network device corresponds to different devices in different systems. For example, the access network device may correspond to an eNB in a 4th generation mobile communication technology (4th generation, 4G) system, and correspond to a 5G access network device, for example, a gNB, in a 5G system. The terminal device in FIG. 2 may be a vehicle-mounted terminal or a vehicle.

Based on the scenario shown in FIG. 2, when the terminal 1 sends the control signaling (carried on a PSCCH) to the terminal 2, a used PSCCH time-frequency resource is fixed. The embodiments of this application provide a communication method. The method may be used to flexibly configure a PSCCH time-frequency resource. The communication method provided in the embodiments of this application may be applied to a V2X scenario (for example, a V2V or V2P scenario), which may be an NR V2X scenario, an LTE V2X scenario, or the like; or may be applied to another scenario or another communication system. This is not specifically limited. An example in which the communication method provided in the embodiments of this application is applied to a V2X scenario is used for description below.

It should be understood that the communication method provided in the embodiments of this application may be performed by a terminal apparatus. The terminal apparatus is, for example, the terminal 1 or the terminal 2 in the V2X scenario shown in FIG. 2. It should be noted that, the terminal apparatus may be an entire terminal, a component or a combination of a plurality of components that is in the terminal and that can perform the following method procedures, a chip that is in the terminal and that can implement the following method procedures, or the like. This is not limited in the embodiments of this application.

Figure 3:
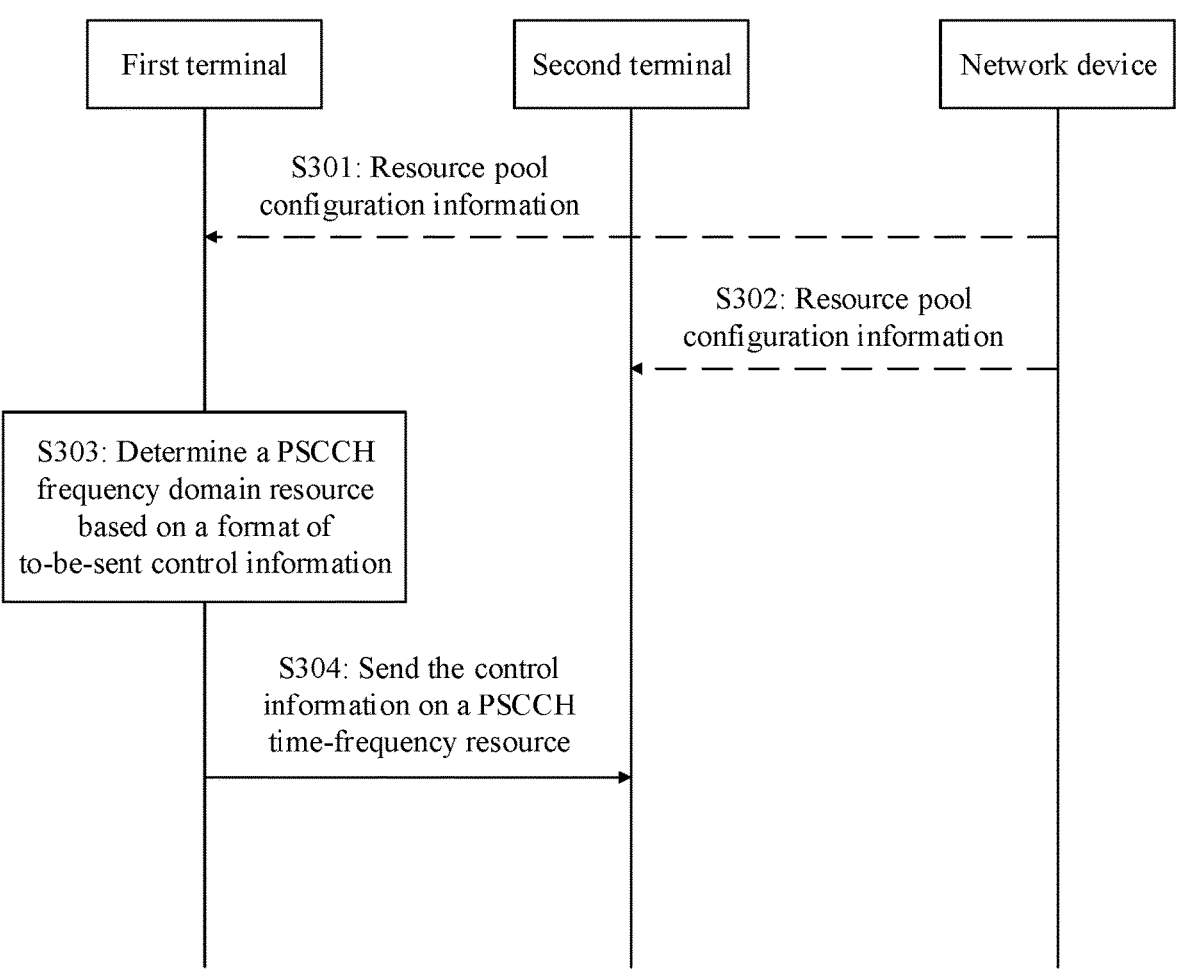
FIG. 3 is a schematic flowchart of a communication method according to an embodiment of this application.

FIG. 3 is a flowchart of a communication method according to an embodiment of this application. The method may be performed by the terminal 1 or the terminal 2 in the application scenario shown in FIG. 2. An example in which the terminal 1 (hereinafter referred to as a first terminal) performs the method is used for description below. As shown in FIG. 3, the method includes the following steps.

S301: The first terminal obtains resource pool configuration information, where the resource pool configuration information includes information about frequency domain bandwidth and information about a PSCCH time domain resource.

Optionally, the first terminal may obtain the resource pool configuration information in two manners. Manner 1: The resource pool configuration information is received from a network device. FIG. 3 is used as an example. The network device may send the resource pool configuration information to the first terminal (the terminal 1), that is, S301 in FIG. 3 (represented by a dashed line in the figure, where the dashed line is used to indicate that the first terminal may alternatively obtain the resource pool configuration information in another manner, and it is not limited that the resource pool configuration information is received from the network device). Alternatively, the network device sends the resource pool configuration information to the first terminal through a second terminal (or a terminal other than the first terminal and the second terminal) (where the process is not shown in FIG. 2). Manner 2: The resource pool configuration information is preconfigured (where the process is not shown in FIG. 2). For example, the first terminal is a mobile phone. Before delivery, the resource pool configuration information may be configured in the mobile phone, for example, configured in a SIM card.

The resource pool configuration information includes subchannel information. For example, the subchannel information may include information about a total quantity of subchannels (total number of subCH) and information about a size of each subchannel (size of subCH), where the total quantity of subchannels is a total quantity of subchannels in one resource pool and is represented by NsubCH, and the size of each subchannel is a quantity of resource blocks (resource blocks, RBs) included in one subchannel and is represented by nsubCHsize.

The resource pool configuration information further includes the PSCCH time domain resource. The PSCCH time domain resource may include at least one subframe, at least one slot, at least one symbol, at least one slot in one or more subframes, at least one symbol in one or more slots, or the like. This is not limited in this embodiment of this application.

Three cases of content included in the PSCCH time domain resource are used as examples in this specification. Case 1: The PSCCH time domain resource is three consecutive symbols. Case 2: The PSCCH time domain resource is two consecutive symbols. Case 3: The PSCCH time domain resource is all symbols that are in one slot and that can be used for a sidelink.

In this embodiment, the PSCCH time domain resource is already configured. It is assumed that the PSCCH time domain resource is three consecutive symbols. In this case, the first terminal can send control information only on the three consecutive symbols. Therefore, when the PSCCH time domain resource is the three consecutive symbols, the first terminal may determine a PSCCH frequency domain resource, and then send the control information on a time-frequency resource including the determined PSCCH frequency domain resource and the three consecutive symbols.

S302: The second terminal obtains resource pool configuration information, where the resource pool configuration information includes information about frequency domain bandwidth and information about a PSCCH time domain resource.

It should be noted that S301 and S302 may be simultaneously performed, or may not be simultaneously performed. An execution sequence of S301 and S302 is not limited.

It should be understood that when two terminals have same resource pool configuration information, the two terminals can communicate with each other. Therefore, the first terminal and the second terminal have same resource pool configuration information, and have a same PSCCH time domain resource. For example, in a possible case, pieces of resource pool configuration information obtained by the terminals are the same. In another possible case, pieces of resource pool configuration information obtained by the terminals are not completely the same. For example, the first terminal obtains two pieces of resource pool configuration information, which are separately configuration information of a resource pool 1 and configuration information of a resource pool 2, and the second terminal obtains two pieces of resource pool configuration information, which are the configuration information of the resource pool 1 and configuration information of a resource pool 3. The first terminal and the second terminal may perform sidelink communication in the resource pool 1.

S303: The first terminal determines a PSCCH frequency domain resource based on a format of to-be-sent control information.

It should be noted that there may be a plurality of types of control information in this embodiment of this application. For example, the control information is sidelink control information (sidelink control information, SCI) or other information.

It should be noted that the format (SCI format) of the control information may correspond to a size of content included in the control information. For example, the format of the control information includes at least one of a control information format 1, a control information format 2, and a control information format 3. Content included in control information corresponding to the control information format 1 is 50 bits to 65 bits (greater than or greater than or equal to 50 bits and less than or less than or equal to 65 bits), content included in control information corresponding to the control information format 2 is 80 bits to 95 bits (greater than or greater than or equal to 80 bits and less than or less than or equal to 95 bits), and content included in control information corresponding to the control information format 3 is 110 bits to 125 bits (greater than or greater than or equal to 110 bits and less than or less than or equal to 125 bits).

Cases are separately described below.

That the first terminal determines the PSCCH frequency domain resource based on the format of the to-be-sent control information includes at least one of the following three cases.

Case 1: The PSCCH time domain resource in the resource pool configuration information is three consecutive symbols.

The first terminal may determine, in the following Table 1, the PSCCH frequency domain resource based on the format of the to-be-sent control information.

TABLE 1

| PSCCH time domain resource | Format of the control information | PSCCH frequency domain resource |
|---|---|---|
| Three symbols | Control information format 1 | Eight RBs |
| | Control information format 2 | 12 RBs |
| | Control information format 3 | 18 RBs |

It is assumed that the format of the to-be-sent control information is the control information format 1, that is, the content included in the corresponding control information is 50 bits to 60 bits. In this case, the first terminal determines, based on Table 1, that the PSCCH frequency domain resource is frequency domain bandwidth corresponding to eight RBs.

It is assumed that the format of the to-be-sent control information is the control information format 2, that is, the content included in the corresponding control information is 80 bits to 95 bits. In this case, the first terminal determines, based on Table 1, that the PSCCH frequency domain resource is frequency domain bandwidth corresponding to 12 RBs.

It is assumed that the format of the to-be-sent control information is the control information format 3, that is, the content included in the corresponding control information is 110 bits to 125 bits. In this case, the first terminal determines, based on Table 1, that the PSCCH frequency domain resource is frequency domain bandwidth corresponding to 18 RBs.

Case 2: The PSCCH time domain resource in the resource pool configuration information is two consecutive symbols.

The first terminal may determine, in the following Table 2, the PSCCH frequency domain resource based on the format of the to-be-sent control information.

TABLE 2

| PSCCH time domain resource | Format of the control information | PSCCH frequency domain resource |
|---|---|---|
| Two symbols | Control information format 1 | 12 RBs |
| | Control information format 2 | 18 RBs |
| | Control information format 3 | 26 RBs |

It is assumed that the format of the to-be-sent control information is the control information format 1, that is, the content included in the control information is 50 bits to 60 bits. In this case, the first terminal determines, based on Table 2, that the PSCCH frequency domain resource is frequency domain bandwidth corresponding to 12 RBs.

It is assumed that the format of the to-be-sent control information is the control information format 2, that is, the content included in the control information is 80 bits to 95 bits. In this case, the first terminal determines, based on Table 2, that the PSCCH frequency domain resource is frequency domain bandwidth corresponding to 18 RBs.

It is assumed that the format of the to-be-sent control information is the control information format 3, that is, the content included in the corresponding control information is 110 bits to 125 bits. In this case, the first terminal determines, based on Table 2, that the PSCCH frequency domain resource is frequency domain bandwidth corresponding to 26 RBs.

Case 3: The PSCCH time domain resource in the resource pool configuration information is all symbols that are in one slot and that can be used for sidelink communication.

The first terminal may determine, in the following Table 3, the PSCCH frequency domain resource based on the format of the to-be-sent control information.

TABLE 3

| PSCCH time domain resource | Format of the control information | PSCCH frequency domain resource |
|---|---|---|
| All symbols that are in one slot and that can be used for sidelink communication | Control information format 1 | Two RBs |
| | Control information format 2 | Three RBs |
| | Control information format 3 | Five RBs |

It is assumed that the format of the to-be-sent control information is the control information format 1, that is, the content included in the control information is 50 bits to 65 bits. In this case, the first terminal determines, based on Table 3, that the PSCCH frequency domain resource is frequency domain bandwidth corresponding to two RBs.

It is assumed that the format of the to-be-sent control information is the control information format 2, that is, the content included in the control information is 80 bits to 95 bits. In this case, the first terminal determines, based on Table 3, that the PSCCH frequency domain resource is frequency domain bandwidth corresponding to three RBs.

It is assumed that the format of the to-be-sent control information is the control information format 3, that is, the content included in the control information is 110 bits to 125 bits. In this case, the first terminal determines, based on Table 3, that the PSCCH frequency domain resource is frequency domain bandwidth corresponding to five RBs.

It can be learned from the foregoing content that the PSCCH time domain resource in the resource pool configuration information is already configured. Therefore, the PSCCH time domain resource of the first terminal is known and is the PSCCH time domain resource in one of the foregoing three cases. In any case, the first terminal may determine the PSCCH frequency domain resource based on the format of the control information.

It should be understood that bandwidth of the PSCCH frequency domain resource determined by the first terminal may be less than or less than or equal to total bandwidth of the subchannels included in the resource pool configuration information. For example, if the quantity of subchannels included in the resource pool configuration information is two, and each subchannel includes 12 RBs, the total bandwidth of the subchannels is 2*12=24 RBs. Therefore, the bandwidth of the PSCCH frequency domain resource determined by the first terminal is less than or less than or equal to 24 RBs, that is, the PSCCH frequency domain resource determined by the first terminal is a frequency domain resource in the resource pool.

S304: The first terminal sends the control information to the second terminal on a PSCCH time-frequency resource, where the PSCCH time-frequency resource includes the PSCCH time domain resource and the PSCCH frequency domain resource. Correspondingly, the second terminal receives the control information.

It should be understood that the resource pool configuration information includes the PSCCH time domain resource, and in S303, the first terminal determines the PSCCH frequency domain resource. Therefore, the first terminal may send the control information on the PSCCH time-frequency resource.

For example, the first terminal may send the control information in a broadcast manner. Correspondingly, the second terminal may perform blind detection on the control information.

The following describes a process in which the second terminal performs blind detection on the control information.

It can be learned from the foregoing content that the second terminal and the first terminal have the same resource pool configuration information. Therefore, the second terminal may learn of the PSCCH time domain resource. It is assumed that the PSCCH time domain resource is three symbols, the second terminal may perform blind detection on the control information on a PSCCH time-frequency resource including the three symbols and frequency domain bandwidth corresponding to eight RBs, on a PSCCH time-frequency resource including the three symbols and frequency domain bandwidth corresponding to 12 RBs, or on a PSCCH time-frequency resource including the three symbols and frequency domain bandwidth corresponding to 18 RBs. It should be understood that a quantity of times of blind detection performed by the second terminal may be the same as a total quantity of formats of control information to be sent by the first terminal.

For example, the second terminal performs detection on the control information on the PSCCH time-frequency resource including the three symbols and the frequency domain bandwidth corresponding to the eight RBs. If the second terminal does not detect the control information, the second terminal performs detection on the control information on the PSCCH time-frequency resource including the three symbols and the frequency domain bandwidth corresponding to the 12 RBs. If the second terminal still does not detect the control information, the second terminal performs detection on the control information on the PSCCH time-frequency resource including the three symbols and the frequency domain bandwidth corresponding to the 18 RBs.

For another example, it is assumed that the PSCCH time domain resource included in the resource pool configuration information includes two symbols, the second terminal may perform blind detection on the control information on a PSCCH time-frequency resource including the two symbols and frequency domain bandwidth corresponding to 12 RBs, on a PSCCH time-frequency resource including the two symbols and frequency domain bandwidth corresponding to 18 RBs, or on a PSCCH time-frequency resource including the two symbols and frequency domain bandwidth corresponding to 26 RBs.

For another example, it is assumed that the PSCCH time domain resource included in the resource pool configuration information includes all symbols that are in one slot and that can be used for sidelink communication, the second terminal may perform blind detection on the control information on a PSCCH time-frequency resource including all the symbols that are in the slot and that can be used for sidelink communication and frequency domain bandwidth corresponding to two RBs, on a PSCCH time-frequency resource including all the symbols that are in the slot and that can be used for sidelink communication and frequency domain bandwidth corresponding to three RBs, or on a PSCCH time-frequency resource including all the symbols that are in the slot and that can be used for sidelink communication and frequency domain bandwidth corresponding to five RBs.

In the foregoing embodiment, the PSCCH time-frequency resource in the resource pool configuration information is known, and only the format of the control information needs to be considered when the first terminal determines the PSCCH frequency domain resource. The following describes another embodiment. In this embodiment, a PSCCH time-frequency resource in resource pool configuration information is configurable, and a first terminal may determine a PSCCH frequency domain resource based on the PSCCH time-frequency resource in the resource pool configuration information and a format of control information.

Figure 4:
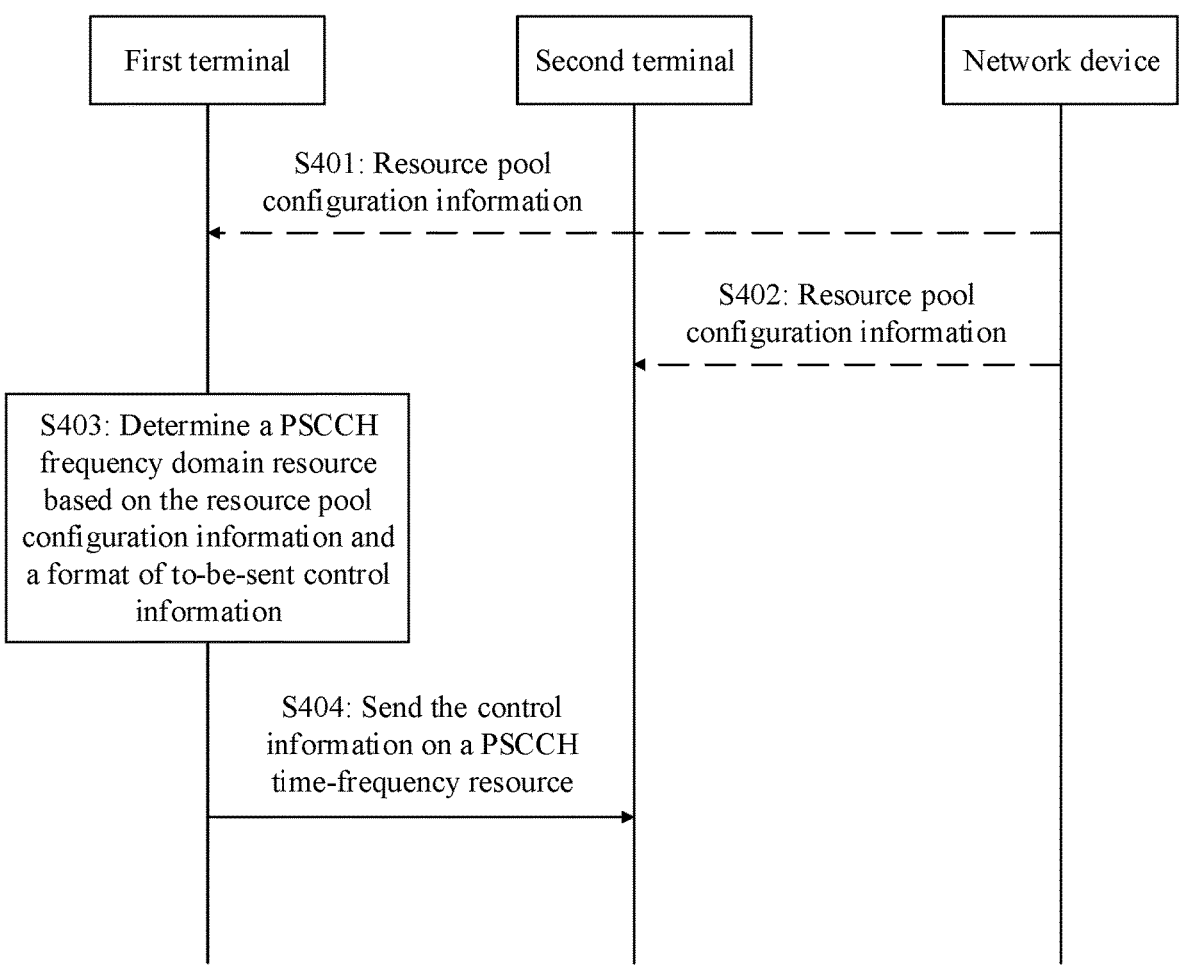
FIG. 4 is a schematic flowchart of a communication method according to an embodiment of this application.

FIG. 4 is a flowchart of a communication method according to an embodiment of this application. The method may be performed by the terminal 1 or the terminal 2 in the application scenario shown in FIG. 2. An example in which the terminal 1 (hereinafter referred to as a first terminal) performs the method is used for description below. As shown in FIG. 4, the method includes the following steps.

S401: The first terminal obtains resource pool configuration information, where the resource pool configuration information includes information about frequency domain bandwidth and information about a PSCCH time domain resource.

S402: A second terminal obtains resource pool configuration information, where the resource pool configuration information includes information about frequency domain bandwidth and information about a PSCCH time domain resource.

Optionally, a manner of obtaining the resource pool configuration information by the first terminal or the second terminal is described above. Details are not described herein again. In this embodiment, the PSCCH time domain resource in the resource pool configuration information is configurable, so that before sending control information, the first terminal may determine a PSCCH frequency domain resource based on the PSCCH time domain resource and the to-be-sent control information.

It should be noted that S401 and S402 may be simultaneously performed, or may not be simultaneously performed. An execution sequence of S401 and S402 is not limited.

S403: The first terminal determines the PSCCH frequency domain resource based on the resource pool configuration information and a format of the control information.

For example, Table 4 is a schematic diagram of a relationship among a PSCCH time domain resource, a format of the control information, and a PSCCH frequency domain resource.

TABLE 4

| PSCCH time domain resource | Format of the control information | PSCCH frequency domain resource |
|---|---|---|
| Three symbols | Control information format 1 | Eight RBs |
| | Control information format 2 | 12 RBs |
| | Control information format 3 | 18 RBs |
| Two symbols | Control information format 1 | 12 RBs |
| | Control information format 2 | 18 RBs |
| | Control information format 3 | 26 RBs |
| All symbols that are in one slot and that can be used for a sidelink | Control information format 1 | Two RBs |
| | Control information format 2 | Three RBs |
| | Control information format 3 | Five RBs |

For example, it is assumed that the PSCCH time domain resource included in the resource pool configuration information is configured to three symbols, and the format of the to-be-sent control information is the control information format 1, that is, content included in the control information is 50 bits to 65 bits. In this case, the first terminal may determine, based on Table 4, that the PSCCH frequency domain resource is eight RBs.

For another example, it is assumed that the PSCCH time domain resource included in the resource pool configuration information is configured to three symbols, and the format of the to-be-sent control information is the control information format 3, that is, content included in the control information is 80 bits to 95 bits. In this case, the first terminal may determine, based on Table 4, that the PSCCH frequency domain resource is 12 RBs.

For another example, it is assumed that the PSCCH time domain resource included in the resource pool configuration information is configured to three symbols, and the format of the to-be-sent control information is the control information format 3, that is, content included in the control information is 110 bits to 125 bits. In this case, the first terminal may determine, based on Table 4, that the PSCCH frequency domain resource is 18 RBs.

For another example, it is assumed that the PSCCH time domain resource included in the resource pool configuration information is configured to two symbols, and the format of the to-be-sent control information is the control information format 1, that is, content included in the control information is 50 bits to 65 bits. In this case, the first terminal may determine, based on Table 4, that the PSCCH frequency domain resource is 12 RBs.

For another example, it is assumed that the PSCCH time domain resource included in the resource pool configuration information is configured to two symbols, and the format of the to-be-sent control information is the control information format 2, that is, content included in the control information is 80 bits to 95 bits. In this case, the first terminal may determine, based on Table 4, that the PSCCH frequency domain resource is 18 RBs.

For another example, it is assumed that the PSCCH time domain resource included in the resource pool configuration information is configured to two symbols, and the format of the to-be-sent control information is the control information format 3, that is, content included in the control information is 110 bits to 125 bits. In this case, the first terminal may determine, based on Table 4, that the PSCCH frequency domain resource is 26 RBs.

For another example, it is assumed that the PSCCH time domain resource included in the resource pool configuration information is configured to all symbols that are in one slot and that can be used for a sidelink, and the format of the to-be-sent control information is the control information format 1, that is, content included in the control information is 50 bits to 65 bits. In this case, the first terminal may determine, based on Table 4, that the PSCCH frequency domain resource is two RBs.

For another example, it is assumed that the PSCCH time domain resource included in the resource pool configuration information is configured to all symbols that are in one slot and that can be used for a sidelink, and the format of the to-be-sent control information is the control information format 2, that is, content included in the control information is 80 bits to 95 bits. In this case, the first terminal may determine, based on Table 4, that the PSCCH frequency domain resource is three RBs.

For another example, it is assumed that the PSCCH time domain resource included in the resource pool configuration information is configured to all symbols that are in one slot and that can be used for a sidelink, and the format of the to-be-sent control information is the control information format 3, that is, content included in the control information is 110 bits to 125 bits. In this case, the first terminal may determine, based on Table 4, that the PSCCH frequency domain resource is five RBs.

S404: The first terminal sends the control information to the second terminal on a PSCCH time-frequency resource, where the PSCCH time-frequency resource includes the PSCCH frequency domain resource and the PSCCH time domain resource. Correspondingly, the second terminal receives the control information.

It should be noted that the resource pool configuration information includes the PSCCH time domain resource. In the foregoing process, the first terminal determines the PSCCH frequency domain resource based on the PSCCH time domain resource and the format of the control information. Therefore, the first terminal may send the control information on the PSCCH time-frequency resource including the PSCCH frequency domain resource and the PSCCH time domain resource that is in the resource pool configuration information.

For example, the first terminal may send the control information in a broadcast manner. Correspondingly, the second terminal may perform blind detection on the control information.

The following describes a process in which the second terminal performs blind detection on the control information.

It can be learned from the foregoing content that the second terminal and the first terminal have the same resource pool configuration information. Therefore, the second terminal may learn of the PSCCH time domain resource. It is assumed that the PSCCH time domain resource is three symbols, the second terminal may perform blind detection on the control information on a PSCCH time-frequency resource including the three symbols and frequency domain bandwidth corresponding to eight RBs, on a PSCCH time-frequency resource including the three symbols and frequency domain bandwidth corresponding to 12 RBs, or on a PSCCH time-frequency resource including the three symbols and frequency domain bandwidth corresponding to 18 RBs.

For example, the second terminal performs detection on the control information on the PSCCH time-frequency resource including the three symbols and the frequency domain bandwidth corresponding to the eight RBs. If the second terminal does not detect the control information, the second terminal performs detection on the control information on the PSCCH time-frequency resource including the three symbols and the frequency domain bandwidth corresponding to the 12 RBs. If the second terminal still does not detect the control information, the second terminal performs detection on the control information on the PSCCH time-frequency resource including the three symbols and the frequency domain bandwidth corresponding to the 18 RBs.

For another example, it is assumed that the PSCCH time domain resource in the resource pool configuration information is configured to two symbols, the second terminal may perform blind detection on the control information on a PSCCH time-frequency resource including the two symbols and frequency domain bandwidth corresponding to 12 RBs, on a PSCCH time-frequency resource including the two symbols and frequency domain bandwidth corresponding to 18 RBs, or on a PSCCH time-frequency resource including the two symbols and frequency domain bandwidth corresponding to 26 RBs.

For another example, it is assumed that the PSCCH time domain resource included in the resource pool configuration information is configured to all symbols that are in one slot and that can be used for sidelink communication, the second terminal may perform blind detection on the control information on a PSCCH time-frequency resource including all the symbols that are in the slot and that can be used for sidelink communication and frequency domain bandwidth corresponding to two RBs, on a PSCCH time-frequency resource including all the symbols that are in the slot and that can be used for sidelink communication and frequency domain bandwidth corresponding to three RBs, or on a PSCCH time-frequency resource including all the symbols that are in the slot and that can be used for sidelink communication and frequency domain bandwidth corresponding to five RBs.

In this embodiment, the PSCCH time domain resource in the resource pool configuration information is configurable, and the first terminal may determine the PSCCH frequency domain resource based on the resource pool configuration information and the to-be-sent control information, that is, the first terminal may flexibly configure the PSCCH time-frequency resource.

If a specific SCI format that can be used by the first terminal is not limited for a resource pool, minimum total bandwidth of subchannels in the resource pool needs to satisfy sizes of PSCCH frequency domain resources corresponding to all SCI formats.

For example, when the PSCCH time domain resource is two symbols, when the resource pool supports an SCI format corresponding to 110 bits to 125 bits, the minimum total bandwidth of the subchannels in the resource pool is 26 RBs (as shown in Table 4). When the resource pool does not support the SCI format corresponding to 110 bits to 125 bits but supports an SCI format corresponding to 80 bits to 95 bits, the minimum total bandwidth of the subchannels in the resource pool is 18 RBs.

For another example, when the PSCCH time domain resource is three symbols, when the resource pool supports an SCI format corresponding to 110 bits to 125 bits, the minimum total bandwidth of the subchannels in the resource pool is 18 RBs. When the resource pool does not support the SCI format corresponding to 110 bits to 125 bits but supports an SCI format corresponding to 80 bits to 95 bits, the minimum total bandwidth of the subchannels in the resource pool is 12 RBs.

For another example, when the PSCCH time domain resource is all symbols that are in one slot and that can be used for an SL, when the resource pool supports an SCI format corresponding to 110 bits to 125 bits, the minimum total bandwidth of the subchannels in the resource pool is five RBs. When the resource pool does not support the SCI format corresponding to 110 bits to 125 bits but supports an SCI format corresponding to 80 bits to 95 bits, the minimum total bandwidth of the subchannels in the resource pool is three RBs.

If a specific SCI format is limited for a resource pool, minimum total bandwidth of subchannels in the resource pool needs to satisfy a size of a PSCCH time-frequency resource used for the specific SCI format.

For example, when the PSCCH time domain resource is two symbols, when it is limited that the resource pool supports only an SCI format corresponding to 110 bits to 125 bits, the minimum total bandwidth of the subchannels in the resource pool is 26 RBs. When it is limited that the resource pool supports only an SCI format corresponding to 80 bits to 95 bits, the minimum total bandwidth of the subchannels in the resource pool is 18 RBs. When it is limited that the resource pool supports only an SCI format corresponding to 50 bits to 65 bits, the minimum total bandwidth of the subchannels in the resource pool is 12 RBs.

For another example, when the PSCCH time domain resource is three symbols, when it is limited that the resource pool supports only an SCI format corresponding to 110 bits to 125 bits, the minimum total bandwidth of the subchannels in the resource pool is 18 RBs. When it is limited that the resource pool supports only an SCI format corresponding to 80 bits to 95 bits, the minimum total bandwidth of the subchannels in the resource pool is 12 RBs. When it is limited that the resource pool supports only an SCI format corresponding to 50 bits to 65 bits, the minimum total bandwidth of the subchannels in the resource pool is eight RBs.

For another example, when the PSCCH time domain resource is all symbols that are in one slot and that can be used for an SL, when it is limited that the resource pool supports only an SCI format corresponding to 110 bits to 125 bits, the minimum total bandwidth of the subchannels in the resource pool is five RBs. When it is limited that the resource pool supports only an SCI format corresponding to 80 bits to 95 bits, the minimum total bandwidth of the subchannels in the resource pool is three RBs. When it is limited that the resource pool supports only an SCI format corresponding to 50 bits to 65 bits, the minimum total bandwidth of the subchannels in the resource pool is two RBs.

Figure 5:
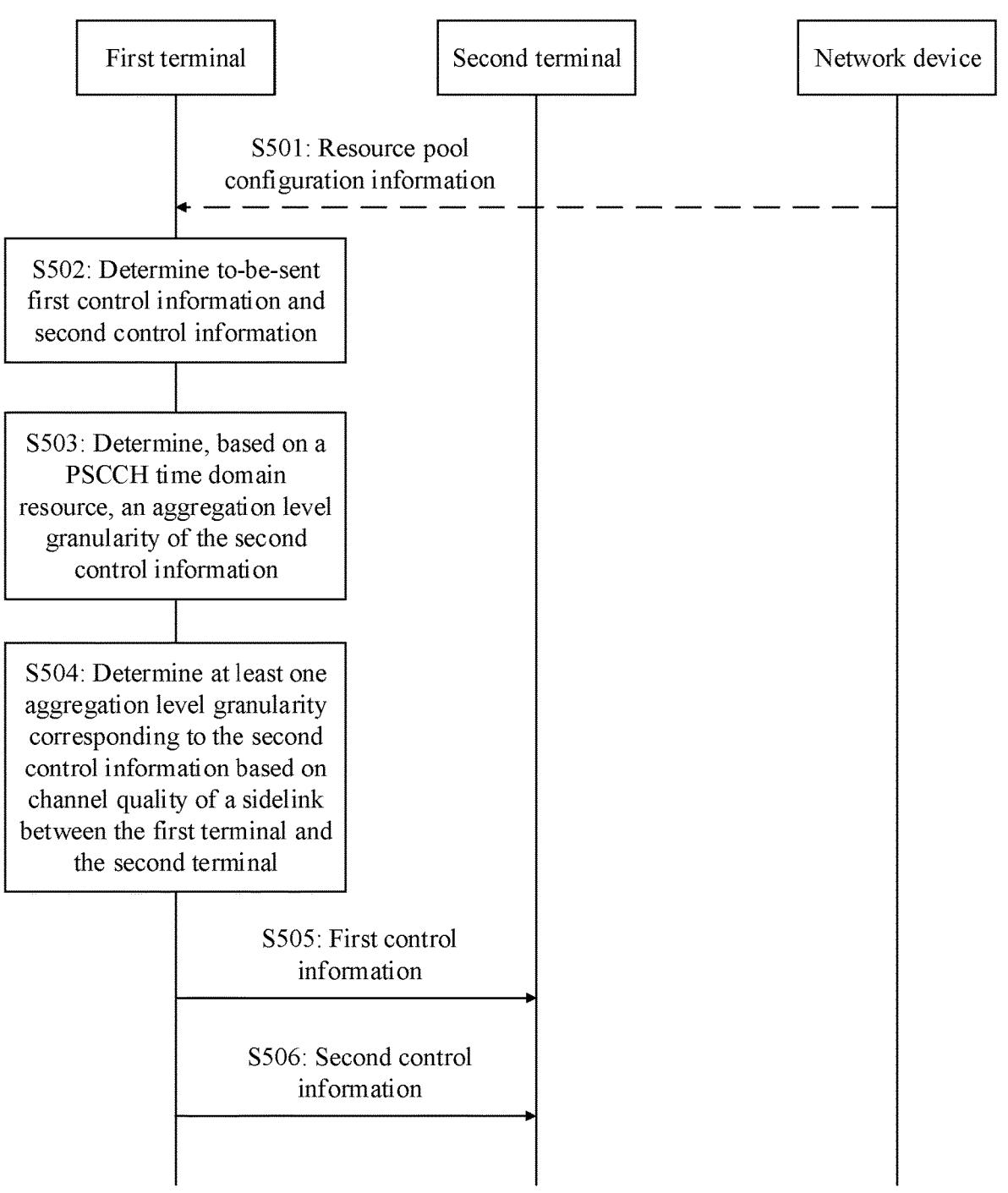
FIG. 5 is a schematic flowchart of a communication method according to an embodiment of this application.

FIG. 5 is a flowchart of a communication method according to an embodiment of this application. The method may be performed by the terminal 1 or the terminal 2 in the application scenario shown in FIG. 1. An example in which the terminal 1 (hereinafter referred to as a first terminal) performs the method is used for description below. As shown in FIG. 5, the method includes the following steps.

S501: The first terminal obtains resource pool configuration information, where the resource pool configuration information includes information about frequency domain bandwidth and information about a PSCCH time domain resource.

A manner of obtaining the resource pool configuration information and specific content of the information about the frequency domain bandwidth are described above. Details are not described herein again.

S502: The first terminal determines to-be-sent first control information and second control information.

Optionally, the second control information may be second-stage control information of the first control information. SCI is used as an example. The first terminal may determine first-stage SCI and second-stage SCI.

The following describes a format of the first-stage SCI and a PSCCH time-frequency resource (hereinafter referred to as a first PSCCH time-frequency resource for short) used for the first-stage SCI.

In an example, the format of the first-stage SCI may be preconfigured (or may be pre-agreed on, where both the first terminal and a second terminal know the format of the first-stage SCI). For example, content included in the first-stage SCI corresponding to the format of the first-stage SCI is 50 bits to 60 bits. The format of the first-stage SCI is not limited in this embodiment of this application.

The PSCCH time-frequency resource used for the first-stage SCI may also be preconfigured (or may be pre-agreed on, where both the first terminal and the second terminal know the PSCCH time-frequency resource used for the first-stage SCI). In other words, the first terminal may send the first-stage SCI on the fixed PSCCH time-frequency resource, and correspondingly, the second terminal receives the first-stage SCI on the fixed PSCCH time-frequency resource. For example, a PSCCH time domain resource is three symbols and a frequency domain resource is eight RBs, or the PSCCH time domain resource is two symbols and the frequency domain resource is 12 RBs.

It should be understood that the format of the first-stage SCI and the first PSCCH time-frequency resource used for the first-stage SCI are known. In this case, the first terminal may determine a format of the second-stage SCI and a PSCCH time-frequency resource (hereinafter referred to as a second PSCCH time-frequency resource for short) used for the second-stage SCI.

As described above, the first terminal already knows the format of the first-stage SCI. After determining a format of to-be-sent SCI, the first terminal may determine the format of the second-stage SCI based on the format of the first-stage SCI and the format of the to-be-sent SCI.

For example, the first terminal determines that content included in the SCI corresponding to the format of the to-be-sent SCI is 120 bits. If the content included in the first-stage SCI is 60 bits, the first terminal determines that content included in the second-stage SCI is 120-60-60 bits.

A process in which the first terminal determines the second PSCCH time-frequency resource of the second-stage SCI is described below.

S503: The first terminal determines, based on the PSCCH time domain resource in the resource pool configuration information, an aggregation level granularity corresponding to the second control information.

In this embodiment of this application, a manner of determining an aggregation level (aggregation level, SL−AL) granularity (granularity) of a PSCCH time-frequency resource is provided. The aggregation level granularity is a minimum unit of the PSCCH time-frequency resource. Specifically, the first terminal may determine the aggregation level granularity based on the PSCCH time domain resource in the resource pool configuration information. It is assumed that the PSCCH time domain resource in the resource pool configuration information includes M symbols. In this case, a time domain resource of the aggregation level granularity is M, and a frequency domain resource of the aggregation level granularity is frequency domain bandwidth corresponding to one RB. In other words, the aggregation level granularity includes, in time domain, the PSCCH time domain resource in the resource pool configuration information, and includes, in frequency domain, the frequency domain bandwidth corresponding to one RB.

For example, if an aggregation level is 1, that is, SL−AL=1, that is, one aggregation level granularity is included, it indicates that the PSCCH time-frequency resource is the PSCCH time domain resource in the resource pool configuration information in time domain and frequency domain bandwidth corresponding to one RB in frequency domain. If an aggregation level is 2, that is, SL−AL=2, that is, two aggregation level granularities are included, it indicates that the PSCCH time-frequency resource is the PSCCH time domain resource in the resource pool configuration information in time domain and frequency domain bandwidth corresponding to two RBs in frequency domain. Therefore, if an aggregation level is N, that is, SL−AL=N, that is, N aggregation level granularities are included, it indicates that the PSCCH time-frequency resource is the PSCCH time domain resource in the resource pool configuration information in time domain and frequency domain bandwidth corresponding to N RBs in frequency domain.

Therefore, in this embodiment of this application, the aggregation level granularity of a PSCCH time-frequency resource may be configured, and may be configured based on the PSCCH time domain resource in the resource pool configuration information.

S504: The first terminal determines at least one aggregation level granularity corresponding to the second control information based on channel quality of a sidelink between the first terminal and the second terminal.

It should be understood that the first terminal may perform detection on the channel quality of the sidelink between the first terminal and the second terminal in a plurality of manners. For example, the first terminal sends first information to the second terminal, and the second terminal measures the first information and then feeds back second information to the first terminal. The second information is used to indicate the channel quality of the sidelink between the first terminal and the second terminal. Alternatively, the first terminal measures third information sent by the second terminal, and determines the channel quality of the sidelink between the first terminal and the second terminal based on a measurement result. The first information and the third information each may be a reference signal, for example, one of other reference signals such as a demodulation reference signal (Demodulation Reference Signal, DMRS) and a channel state information reference signal (Channel State Information Reference Signal, CSI-RS). Alternatively, the first information and the third information are data information. A manner in which the first terminal determines the channel quality of the sidelink between the first terminal and the second terminal is not limited in this embodiment of this application.

It should be noted that both a first PSCCH time domain resource corresponding to the first control information and a second PSCCH time-frequency resource corresponding to the second control information may be indicated by using an aggregation level granularity. It can be learned from the foregoing content that the first PSCCH time-frequency resource corresponding to the first control information is fixed. For example, the first PSCCH time-frequency resource is represented by SL−AL=2. In other words, the first PSCCH time-frequency resource includes, in time domain, the PSCCH time domain resource in the resource pool configuration information, and includes, in frequency domain, frequency domain bandwidth corresponding to two RBs. Because both the first terminal and the second terminal know the first PSCCH time-frequency resource, the first terminal does not need to determine the first PSCCH time-frequency resource, and the second terminal also does not need to perform blind detection on the first-stage SCI.

The following describes a process in which the first terminal determines the second PSCCH time-frequency resource corresponding to the second control information.

For example, the first terminal may determine the second PSCCH time-frequency resource based on communication quality of the sidelink between the first terminal and the second terminal, and further determine an SL–AL.

Optionally, when the communication quality of the sidelink between the first terminal and the second terminal is greater than a first threshold, the first terminal determines that the SL–AL corresponding to the second PSCCH time-frequency resource is a first value. When the communication quality of the sidelink between the first terminal and the second terminal is less than a second threshold, the first terminal determines that the SL–AL corresponding to the second PSCCH time-frequency resource is a second value. The first threshold is greater than the second threshold, and the first value of the SL–AL is less than the second value of the SL–AL.

For example, when the communication quality of the sidelink between the first terminal and the second terminal is relatively good, the first terminal determines that the SL–AL is relatively small. Because an SL–AL granularity includes, in frequency domain, frequency domain bandwidth corresponding to one RB, when the AL–SL is relatively small, the second PSCCH time-frequency resource includes relatively small frequency domain bandwidth, that is, the second PSCCH time-frequency resource corresponding to the second control information is relatively small. Therefore, when the communication quality of the sidelink between the first terminal and the second terminal is relatively good, the second control information is transmitted by using the relatively small second PSCCH time-frequency resource. This improves resource utilization.

For another example, when the communication quality of the sidelink between the first terminal and the second terminal is relatively poor, the first terminal may determine that the SL–AL is relatively large. Because an SL–AL granularity includes, in frequency domain, frequency domain bandwidth corresponding to one RB, when the AL–SL is relatively large, the second PSCCH time-frequency resource includes relatively large frequency domain bandwidth, that is, the second PSCCH time-frequency resource corresponding to the second control information is relatively large. Therefore, when the communication quality of the sidelink between the first terminal and the second terminal is relatively poor, the second control information is transmitted by using the relatively large second PSCCH time-frequency resource. This ensures successful transmission of the second control information.

S505: The first terminal sends the first control information to the second terminal, where the first control information includes first indication information, the first indication information is used to indicate the at least one aggregation level granularity, and the at least one aggregation level granularity is used to receive the second control information. Correspondingly, the second terminal receives the first control information.

It can be learned from the foregoing content that the first PSCCH time-frequency resource corresponding to the first control information is known, so that the second terminal knows the first PSCCH time-frequency resource corresponding to the first control information. However, the second terminal does not know the second PSCCH time-frequency resource corresponding to the second control information, so that the first terminal sends the first control information to the second terminal, where the first control information includes the first indication information, and the first indication information is used to indicate the at least one aggregation level granularity. Correspondingly, the second terminal receives the first control information on the first PSCCH time-frequency resource, and then receives the second control information based on the at least one aggregation level granularity indicated by the first indication information in the first control information. In this way, a blind detection process is not performed.

S506: The first terminal sends the second control information. Correspondingly, the second terminal receives the second control information.

It should be understood that, in the foregoing process, the first terminal determines the second PSCCH time-frequency resource corresponding to the second control information, so that the first terminal sends the second control information on the second PSCCH time-frequency resource. After receiving the first control information, the second terminal may determine the second PSCCH time-frequency resource based on an aggregation level indicated by the first indication information in the first control information, so that the second terminal receives the second control information on the second PSCCH time-frequency resource.

The implementations of this application may be combined randomly to achieve different technical effects.

Figure 6:
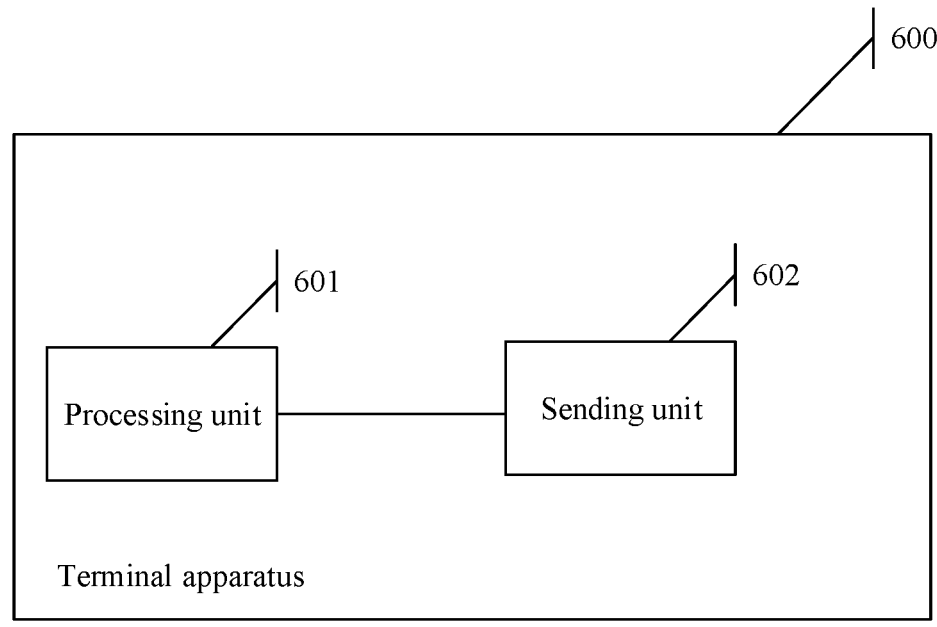
FIG. 6 is a schematic diagram of a terminal apparatus according to an embodiment of this application.

An embodiment of this application further provides a terminal apparatus, configured to perform the method performed by the first terminal in the foregoing method embodiments. For a related feature, refer to the foregoing method embodiments. Details are not described herein again. As shown in FIG. 6, the terminal apparatus includes a processing unit 601 and a sending unit 602. Certainly, the terminal apparatus may further include a receiving unit (not shown in the figure).

It should be noted that, the apparatus shown in FIG. 6 may be an entire terminal, a component or a combination of a plurality of components that is in the terminal and that can perform the following method procedures, a chip or a chip system that is in the terminal and that can implement the following method procedures, or the like. This is not limited in this embodiment of this application.

When the terminal apparatus is a terminal, the receiving unit may be a receiver and may include an antenna, a radio frequency circuit, and the like, and the processing unit may be one or more processors, for example, a central processing unit (central processing unit, CPU).

When the terminal apparatus is a component having the foregoing terminal function, the receiving unit may be a radio frequency unit, and the processing unit may be a processor.

When the terminal apparatus is a chip system, the receiving unit may be an input/output interface of the chip system, and the processing unit may be a processor of the chip system.

When the terminal apparatus shown in FIG. 6 is the first terminal in the foregoing embodiment, the receiving unit may be configured to: perform steps S301 and S302 in the embodiment shown in FIG. 3, and/or support another process of the technology described in this specification; the sending unit 602 may be configured to: perform step S304 in the embodiment shown in FIG. 3, and/or support another process of the technology described in this specification. The processing unit 601 may be configured to: perform S303 in the embodiment shown in FIG. 3, and/or support another process of the technology described in this specification. All related content of the steps in the foregoing method embodiment may be cited in function descriptions of the corresponding function modules. Details are not described herein again.

Alternatively, when the terminal apparatus 600 shown in FIG. 6 is the first terminal in the foregoing embodiment, the receiving unit may be configured to: perform steps S401 and S402 in the embodiment shown in FIG. 4, and/or support another process of the technology described in this specification; the sending unit 602 may be configured to: perform step S404 in the embodiment shown in FIG. 4, and/or support another process of the technology described in this specification. The processing unit 601 may be configured to: perform S403 in the embodiment shown in FIG. 4, and/or support another process of the technology described in this specification. All related content of the steps in the foregoing method embodiment may be cited in function descriptions of the corresponding function modules. Details are not described herein again.

Alternatively, when the terminal apparatus shown in FIG. 6 is the first terminal in the foregoing embodiment, the receiving unit may be configured to: perform step S501 in the embodiment shown in FIG. 5, and/or support another process of the technology described in this specification; the sending unit 602 may be configured to: perform steps S505 and S506 in the embodiment shown in FIG. 5, and/or support another process of the technology described in this specification. The processing unit 601 may be configured to: perform S502, S503, and S504 in the embodiment shown in FIG. 5, and/or support another process of the technology described in this specification. All related content of the steps in the foregoing method embodiment may be cited in function descriptions of the corresponding function modules. Details are not described herein again.

Figure 7:
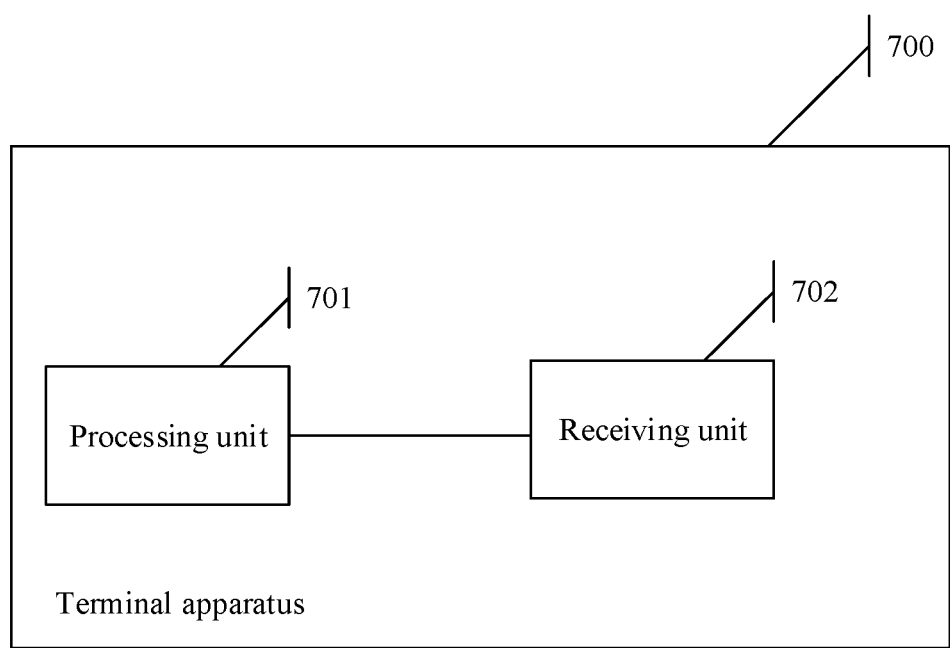
FIG. 7 is a schematic diagram of a terminal apparatus according to an embodiment of this application.

An embodiment of this application further provides a terminal apparatus, configured to perform the method performed by the terminal in the foregoing method embodiments. For a related feature, refer to the foregoing method embodiments. Details are not described herein again. As shown in FIG. 7, the apparatus 700 includes a processing unit 701 and a receiving unit 702. Certainly, the terminal apparatus 700 may further include a sending unit (not shown in the figure).

It should be noted that, the apparatus shown in FIG. 7 may be an entire terminal, a component or a combination of a plurality of components that is in the terminal and that can perform the following method procedures, a chip that is in the terminal and that can implement the following method procedures, or the like. This is not limited in this embodiment of this application.

When the terminal apparatus is a terminal, the receiving unit may be a receiver and may include an antenna, a radio frequency circuit, and the like, and the processing unit may be one or more processors, for example, a central processing unit (central processing unit, CPU).

When the terminal apparatus is a component having the foregoing terminal function, the receiving unit may be a radio frequency unit, and the processing unit may be a processor.

When the terminal apparatus is a chip system, the receiving unit may be an input/output interface of the chip system, and the processing unit may be a processor of the chip system.

When the terminal apparatus shown in FIG. 7 is the second terminal in the foregoing embodiment, the receiving unit 702 may be configured to: perform step S302 in the embodiment shown in FIG. 3, and/or support another process of the technology described in this specification; the processing unit 701 is configured to determine a first PSCCH frequency domain resource (where the process is not shown in FIG. 3); the receiving unit 702 is configured to receive control information from a first terminal apparatus on a first PSCCH time-frequency resource, where the first PSCCH time-frequency resource includes a PSCCH time domain resource and the first PSCCH frequency domain resource (where the process is not shown in FIG. 3); when the receiving unit 702 does not receive the control information from the first terminal apparatus on the first PSCCH time-frequency resource, the processing unit 701 determines a second PSCCH frequency domain resource (where the process is not shown in FIG. 3); the receiving unit 702 receives the control information from the first terminal apparatus on a second PSCCH time-frequency resource, where the second PSCCH time-frequency resource includes the PSCCH time domain resource and the second PSCCH frequency domain resource, that is, step S304 in the embodiment shown in FIG. 3, and/or the receiving unit 702 is configured to support another process in the technology described in this specification.

Alternatively, when the terminal apparatus shown in FIG. 7 is the second terminal in the foregoing embodiment, the receiving unit 702 may be configured to: perform step S402 in the embodiment shown in FIG. 4, and/or support another process of the technology described in this specification; the processing unit 701 is configured to determine a first PSCCH frequency domain resource (where the process is not shown in FIG. 4); the receiving unit 702 is configured to receive control information from a first terminal apparatus on a first PSCCH time-frequency resource, where the first PSCCH time-frequency resource includes a PSCCH time domain resource and the first PSCCH frequency domain resource (where the process is not shown in FIG. 4); when the receiving unit 702 does not receive the control information from the first terminal apparatus on the first PSCCH time-frequency resource, the processing unit 701 determines a second PSCCH frequency domain resource (where the process is not shown in FIG. 4); the receiving unit 702 receives the control information from the first terminal apparatus on a second PSCCH time-frequency resource, where the second PSCCH time-frequency resource includes the PSCCH time domain resource and the second PSCCH frequency domain resource, that is, step S404 in the embodiment shown in FIG. 4, and/or the receiving unit 702 is configured to support another process in the technology described in this specification.

Alternatively, when the terminal apparatus shown in FIG. 7 is the second terminal in the foregoing embodiment, the receiving unit 702 may be configured to: perform steps S505 and S506 in the embodiment shown in FIG. 5, and/or support another process of the technology described in this specification. All related content of the steps in the foregoing method embodiment may be cited in function descriptions of the corresponding function modules. Details are not described herein again.

Division into units in the embodiments of this application is an example, and is merely logical function division. During actual implementation, another division manner may be used. In addition, function units in the embodiments of this application may be integrated into one processor, or may exist alone physically, or two or more units may be integrated into one module. The foregoing integrated unit may be implemented in a form of hardware, or may be implemented in a form of a software function module.

When the integrated unit is implemented in a form of a software function unit and sold or used as an independent product, the integrated unit may be stored in a computer-readable storage medium. Based on such an understanding, the technical solutions of this application essentially, or the part contributing to a current technology, or all or some of the technical solutions may be implemented in a form of a software product. The computer software product is stored in a storage medium and includes several instructions for instructing a terminal device (which may be a personal computer, a mobile phone, a network device, or the like) or a processor (processor) to perform all or some of the steps of the methods in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

In the embodiments of this application, the terminal apparatus may be presented in a form of function modules obtained through division in an integrated manner. The "module" herein may be a specific ASIC, a circuit, a processor executing one or more software or firmware programs, a memory, an integrated logic circuit, and/or another component that can provide the foregoing functions.

Figure 8:
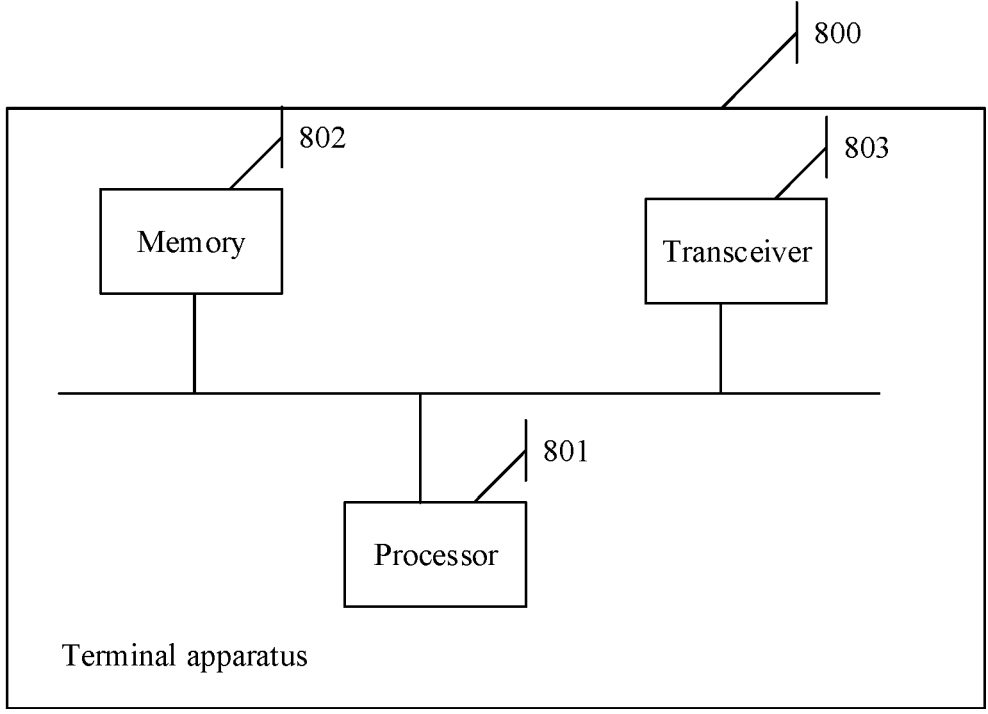
FIG. 8 is a schematic diagram of a terminal apparatus according to an embodiment of this application.

Based on a same inventive concept as the method embodiments, an embodiment of this application further provides a terminal apparatus, configured to perform the method performed by the terminal in the foregoing method embodiments. For a related feature, refer to the foregoing method embodiments. Details are not described herein again. As shown in FIG. 8, the apparatus 800 includes at least one processor 801, a memory 802, and a transceiver 803. It should be noted that, the apparatus 800 shown in FIG. 8 may be an entire terminal, a component or a combination of a plurality of components that is in the terminal and that can perform the following method procedures, a chip system that is in the terminal and that can implement the following method procedures, or the like. This is not limited in this embodiment of this application.

The memory 802 may be a volatile memory such as a random access memory. Alternatively, the memory may be a non-volatile memory such as a read-only memory, a flash memory, a hard disk drive (hard disk drive, HDD), or a solid-state drive (solid-state drive, SSD). Alternatively, the memory 802 is any other medium that can be configured to carry or store expected program code in an instruction form or a data structure form and that can be accessed by a computer. However, the memory 802 is not limited thereto. The memory 802 may be a combination of the foregoing memories.

A specific connection medium between the processor 801 and the memory 802 is not limited in this embodiment of this application.

The transceiver 803 is configured to send and receive data. For example, the transceiver 803 may include a receiver and a transmitter. The processor 801 may communicate with another device through the transceiver 803.

When the terminal apparatus shown in FIG. 8 is a first terminal apparatus, the receiver may be configured to: perform steps S301 and S302 in the embodiment shown in FIG. 3, and/or support another process of the technology described in this specification; the transmitter may be configured to: perform step S304 in the embodiment shown in FIG. 3, and/or support another process of the technology described in this specification. The processor 801 may be configured to: perform S303 in the embodiment shown in FIG. 3, and/or support another process of the technology described in this specification. All related content of the steps in the foregoing method embodiment may be cited in function descriptions of the corresponding function modules. Details are not described herein again.

Alternatively, the receiver may be configured to: perform steps S401 and S402 in the embodiment shown in FIG. 4, and/or support another process of the technology described in this specification; the transmitter may be configured to: perform step S404 in the embodiment shown in FIG. 4, and/or support another process of the technology described in this specification. The processor 801 may be configured to: perform S403 in the embodiment shown in FIG. 4, and/or support another process of the technology described in this specification. All related content of the steps in the foregoing method embodiment may be cited in function descriptions of the corresponding function modules. Details are not described herein again.

Alternatively, the receiver may be configured to: perform step S501 in the embodiment shown in FIG. 5, and/or support another process of the technology described in this specification; the transmitter may be configured to: perform steps S505 and S506 in the embodiment shown in FIG. 5, and/or support another process of the technology described in this specification. The processor 801 may be configured to: perform S502, S503, and S504 in the embodiment shown in FIG. 5, and/or support another process of the technology described in this specification. All related content of the steps in the foregoing method embodiment may be cited in function descriptions of the corresponding function modules. Details are not described herein again.

When the terminal apparatus shown in FIG. 8 is a second terminal apparatus, the receiver may be configured to: perform S304 in the embodiment shown in FIG. 3, and/or support another process of the technology described in this specification. All related content of the steps in the foregoing method embodiment may be cited in function descriptions of the corresponding function modules. Details are not described herein again.

Alternatively, the receiver may be configured to: perform S404 in the embodiment shown in FIG. 4, and/or support another process of the technology described in this specification. All related content of the steps in the foregoing method embodiment may be cited in function descriptions of the corresponding function modules. Details are not described herein again.

Alternatively, the receiver may be configured to: perform S505 and S506 in the embodiment shown in FIG. 5, and/or support another process of the technology described in this specification. All related content of the steps in the foregoing method embodiment may be cited in function descriptions of the corresponding function modules. Details are not described herein again.

In some other embodiments, a size of a PSCCH time domain resource and a size of a PSCCH frequency domain resource may be preconfigured in resource pool configuration information. A first terminal and a second terminal share the resource pool configuration information. Therefore, the first terminal may determine a PSCCH time-frequency resource based on the resource pool configuration information, and send control information on the PSCCH time-frequency resource. In other words, the first terminal does not need to determine the PSCCH time-frequency resource based on a format of the to-be-sent control information. Correspondingly, the second terminal receives the control information on the PSCCH time-frequency resource configured by using the resource pool configuration information, and does not need to perform blind detection.

Figure 9:
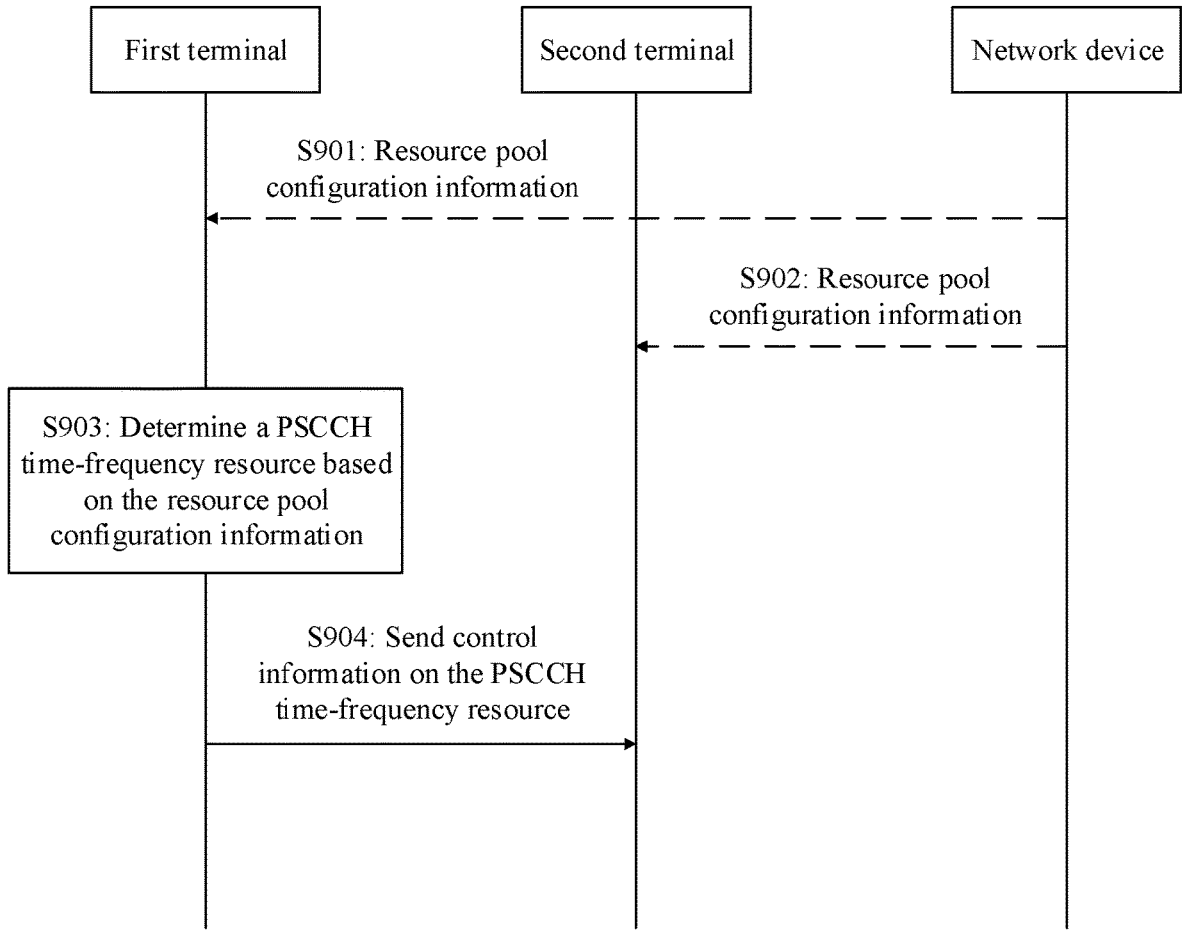
FIG. 9 is a schematic flowchart of a communication method according to an embodiment of this application.

For example, FIG. 9 is a schematic flowchart of another communication method according to an embodiment of this application. As shown in FIG. 9, a procedure of the method includes the following steps.

S901: A first terminal obtains resource pool configuration information, where the resource pool configuration information is used to indicate a size of a PSCCH time domain resource and a size of a PSCCH frequency domain resource.

S902: A second terminal obtains the resource pool configuration information, where the resource pool configuration information is used to indicate the size of the PSCCH time domain resource and the size of the PSCCH frequency domain resource.

The first terminal or the second terminal may obtain the resource pool configuration information in two manners. Manner 1: The resource pool configuration information is received from a network device. FIG. 9 is used as an example. The network device may send the resource pool configuration information to the first terminal (a terminal 1), that is, S901 in FIG. 9, where S901 is represented by a dashed line in the figure, the dashed line is used to indicate that the first terminal may alternatively obtain the resource pool configuration information in another manner, and it is not limited that the resource pool configuration information is received from the network device. Alternatively, the network device sends the resource pool configuration information to the first terminal through the second terminal (or a terminal other than the first terminal and the second terminal) (where the process is not shown in FIG. 9). Manner 2: The resource pool configuration information is preconfigured (where the process is not shown in FIG. 9). For example, the first terminal is a mobile phone, and the resource pool configuration information may be, for example, configured in a SIM card.

In a possible case, the resource pool configuration information includes PSCCH resource format indication information, where the PSCCH resource format indication information may be a PSCCH resource format index (index), and the index is used to indicate the size of the PSCCH time domain resource and the size of the PSCCH frequency domain resource. For example, one index may correspond to one resource format (resource format), and one resource format is a combination of a size of a PSCCH time domain resource and a size of a PSCCH frequency domain resource. When at least one resource format exists, it is assumed that the resource pool configuration information includes a first index. In this case, the first terminal may determine, in the at least one resource format, a first resource format corresponding to the first index, and then send control information on a PSCCH time domain resource and a PSCCH frequency domain resource that correspond to the first resource format.

For example, the at least one resource format may include one or more of the following resource formats:

a size of a PSCCH frequency domain resource is eight RBs and a size of a PSCCH time domain resource is three consecutive symbols; a size of a PSCCH frequency domain resource is frequency domain bandwidth corresponding to 10 RBs and a size of a PSCCH time domain resource is three consecutive symbols; a size of a PSCCH frequency domain resource is frequency domain bandwidth corresponding to 12 RBs and a size of a PSCCH time domain resource is three consecutive symbols; a size of a PSCCH frequency domain resource is frequency domain bandwidth corresponding to 12 RBs and a size of a PSCCH time domain resource is two consecutive symbols; a size of a PSCCH frequency domain resource is frequency domain bandwidth corresponding to 15 RBs and a size of a PSCCH time domain resource is two consecutive symbols; a size of a PSCCH frequency domain resource is frequency domain bandwidth corresponding to 18 RBs and a size of a PSCCH time domain resource is two consecutive symbols; a size of a PSCCH frequency domain resource is frequency domain bandwidth corresponding to three RBs and a size of a PSCCH time domain resource is eight consecutive symbols; a size of a PSCCH frequency domain resource is frequency domain bandwidth corresponding to three RBs and a size of a PSCCH time domain resource is eight consecutive symbols; a size of a PSCCH frequency domain resource is frequency domain bandwidth corresponding to four RBs and a size of a PSCCH time domain resource is eight consecutive symbols; a size of a PSCCH frequency domain resource is frequency domain bandwidth corresponding to three RBs and a size of a PSCCH time domain resource is nine consecutive symbols; a size of a PSCCH frequency domain resource is frequency domain bandwidth corresponding to four RBs and a size of a PSCCH time domain resource is nine consecutive symbols; a size of a PSCCH frequency domain resource is frequency domain bandwidth corresponding to four RBs and a size of a PSCCH time domain resource is nine consecutive symbols; a size of a PSCCH frequency domain resource is frequency domain bandwidth corresponding to three RBs and a size of a PSCCH time domain resource is 10 consecutive symbols; a size of a PSCCH frequency domain resource is frequency domain bandwidth corresponding to three RBs and a size of a PSCCH time domain resource is 10 consecutive symbols; a size of a PSCCH frequency domain resource is frequency domain bandwidth corresponding to four RBs and a size of a PSCCH time domain resource is 10 consecutive symbols; a size of a PSCCH frequency domain resource is frequency domain bandwidth corresponding to two RBs and a size of a PSCCH time domain resource is 11 or 12 consecutive symbols; a size of a PSCCH frequency domain resource is frequency domain bandwidth corresponding to three RBs and a size of a PSCCH time domain resource is 11 or 12 consecutive symbols; or a size of a PSCCH frequency domain resource is frequency domain bandwidth corresponding to three RBs and a size of a PSCCH time domain resource is 11 or 12 consecutive symbols.

It should be noted that a case in which the PSCCH time domain resource is all symbols that are in one slot and that can be used for sidelink communication includes a case in which time domain information included in a PSCCH resource format is Aug. 9, 2010/11/12 consecutive symbols. Different quantities of symbols that can be used for sidelink communication are determined based on whether the slot includes both an uplink symbol and/or a downlink symbol and a sidelink symbol, whether the slot includes a symbol having an extended cyclic prefix (Extended Cyclic Prefix, ECP) or a normal cyclic prefix (Normal CP, NCP), and/or whether the slot includes a symbol on which the second terminal feeds back sidelink control information to the first terminal.

For example, Table 5 is an example of a mapping relationship between a PSCCH resource format index (index)

and a PSCCH resource format, where one resource format is a combination of a size of a PSCCH time domain resource and a size of a PSCCH frequency domain resource. With reference to Table 5, one index corresponds to one PSCCH resource format in a PSCCH resource format table (for example, the following Table 5), that is, a combination of a size of a PSCCH frequency domain resource and a size of a PSCCH time domain resource. As described above, there are 24 different PSCCH resource formats. Therefore, a size of a PSCCH resource format index (index) is five bits.

TABLE 5

| PSCCH resource format index [PSCCH resource format index] | PSCCH time domain resource information (Quantity of OFDM symbols) [Number of PSCCH symbols] | PSCCH frequency domain resource information (Quantity of resource blocks) [Number of RBs] |
|---|---|---|
| 0 | 2 | 12 |
| 1 | 2 | 15 |
| 2 | 2 | 18 |
| 3 | 3 | 8 |
| 4 | 3 | 10 |
| 5 | 3 | 12 |
| 9 | 8 | 3 |
| 10 | 8 | 4 |
| 11 | 8 | 5 |
| 12 | 9 | 3 |
| 13 | 9 | 4 |
| 14 | 9 | 4 |
| 15 | 10 | 3 |
| 16 | 10 | 3 |
| 17 | 10 | 4 |
| 18 | 11 | 2 |
| 19 | 11 | 3 |
| 20 | 11 | 3 |
| 21 | 12 | 2 |
| 22 | 12 | 3 |
| 23 | 12 | 3 |
| 24 | Reserved | |

It may be understood that Table 5 is an example of all possible PSCCH resource formats and corresponding PSCCH resource format indexes. During actual application, the resource pool configuration information may include only a part of PSCCH resource formats and corresponding PSCCH resource format indexes in the foregoing Table 5. The part of PSCCH resource formats may be any part of PSCCH resource formats in the foregoing Table 5. If the resource pool configuration information includes only a part of PSCCH resource formats, a PSCCH resource format index may be adjusted. For example, if the resource pool configuration information includes only three PSCCH resource formats, correspondingly, only three PSCCH resource format indexes are required. Therefore, the PSCCH resource format index may occupy a relatively small quantity of bits. For example, the PSCCH resource format indexes are 0 to 2, that is, only two bits are occupied.

In other words, Table 5 is a presentation form of a set of PSCCH resource formats. In an actual situation, the PSCCH resource format may be at least one PSCCH resource format in Table 5. For example, in the following Table 6, there are three different PSCCH resource formats in total. Therefore, a size of a PSCCH resource format index is two bits. Therefore, it may be understood that when a total quantity of PSCCH resource formats changes, PSCCH resource format indexes with different sizes may be used.

TABLE 6

| PSCCH resource format indication index [PSCCH resource format index] | PSCCH time domain resource information (Quantity of OFDM symbols) [Number of PSCCH symbols] | PSCCH frequency domain resource information (Quantity of resource blocks) [Number of RBs] |
|---|---|---|
| 0 | 3 | 8 |
| 1 | 3 | 10 |
| 2 | 3 | 12 |
| 3 | Reserved | Reserved |

It should be understood that the resource pool configuration information may include only a PSCCH resource format index, or may include a mapping relationship between a PSCCH resource format index and a PSCCH resource format (for example, the foregoing Table 5 or Table 6, or any part in Table 5).

For a same piece of control information, a size of the control information remains unchanged, but different PSCCH resource formats exist. Different PSCCH resource formats correspond to different sizes of PSCCH resources, which means that corresponding code rates of PSCCHs are different. In other words, for a piece of control information sent by the first terminal, a larger used PSCCH time-frequency resource indicates a lower code rate, a lower bit error rate at which the second device receives and decodes the control information, and higher reliability of communication between the first terminal and the second terminal. On the contrary, a smaller used PSCCH time-frequency resource indicates a higher code rate, a higher bit error rate at which the second device receives and decodes the control information, and lower reliability of communication between the first terminal and the second terminal. In this case, in a communication system, different PSCCH resource formats may be configured based on requirements of different transmission services by configuring resource pools, to meet reliability requirements of different services and further improve efficiency of the system.

S904: The first terminal sends control information on a PSCCH time-frequency resource. Correspondingly, the second terminal receives the control information on the PSCCH time-frequency resource.

For example, the first terminal and the second terminal share the resource pool configuration information. Therefore, the first terminal may send the control information in a broadcast manner; and the second terminal may determine the corresponding PSCCH time-frequency resource based on the PSCCH resource format index in the resource pool configuration information and receive the control information on the PSCCH time-frequency resource, and does not need to perform blind detection on the control information.

The terminal apparatus shown in FIG. 6 is used as an example. When the terminal apparatus shown in FIG. 6 is the first terminal in the foregoing embodiment (for example, the embodiment shown in FIG. 9), the receiving unit (not shown in FIG. 6) may be configured to: perform step S901 in the embodiment shown in FIG. 9, and/or support another process of the technology described in this specification; the sending unit 602 may be configured to: perform step S904 in the embodiment shown in FIG. 9, and/or support another process of the technology described in this specification. The processing unit 601 may be configured to: perform step S903 in the embodiment shown in FIG. 9, and/or support another process of the technology described in this specification. All related content of the steps in the foregoing method embodiment may be cited in function descriptions of the corresponding function modules. Details are not described herein again.

The terminal apparatus shown in FIG. 7 is used as an example. When the terminal apparatus shown in FIG. 7 is the second terminal in the foregoing embodiment (for example, the embodiment shown in FIG. 9), the receiving unit 702 may be configured to: perform step S902 in the embodiment shown in FIG. 9, and/or support another process of the technology described in this specification; the processing unit 701 is configured to determine a PSCCH time-frequency resource based on resource pool configuration information (where the process is not shown in FIG. 9); the receiving unit 702 is configured to: perform step S904 in the embodiment shown in FIG. 9, and/or support another process of the technology described in this specification.

The terminal apparatus shown in FIG. 8 is used as an example. When the terminal apparatus shown in FIG. 8 is the first terminal in the foregoing embodiment (for example, the embodiment shown in FIG. 9), the receiver may be configured to: perform step S901 in the embodiment shown in FIG. 9, and/or support another process of the technology described in this specification; the transmitter may be configured to: perform step S904 in the embodiment shown in FIG. 9, and/or support another process of the technology described in this specification. The processor 801 may be configured to: perform S903 in the embodiment shown in FIG. 9, and/or support another process of the technology described in this specification. All related content of the steps in the foregoing method embodiment may be cited in function descriptions of the corresponding function modules. Details are not described herein again.

The terminal apparatus shown in FIG. 8 is used as an example. When the terminal apparatus shown in FIG. 8 is the second terminal in the foregoing embodiment (for example, the embodiment shown in FIG. 9), the receiver may be configured to: perform steps S902 and S904 in the embodiment shown in FIG. 9, and/or support another process of the technology described in this specification. The processor 801 may be configured to determine a PSCCH time-frequency resource based on resource pool configuration information (where the process is not shown in FIG. 9). All related content of the steps in the foregoing method embodiment may be cited in function descriptions of the corresponding function modules. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer usable storage media (including but not limited to a magnetic disk memory, a CD-ROM, an optical memory, and the like) that include computer usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:

obtaining, by a first terminal apparatus, resource pool configuration information, wherein the resource pool configuration information comprises information about a physical sidelink control channel (PSCCH) time domain resource;

determining, by the first terminal apparatus, a PSCCH frequency domain resource based on the resource pool configuration information and a format of control information, comprising:

in response to the PSCCH time domain resource comprising three consecutive symbols, and the content comprised in the control information corresponding to the format of the control information being greater than or greater than or equal to 50 bits and less than or less than or equal to 60 bits, determining that the PSCCH frequency domain resource is frequency domain bandwidth corresponding to eight resource blocks (RBs); and sending, by the first terminal apparatus, the control information to a second terminal apparatus, wherein the control information is carried on a PSCCH time-frequency resource, and wherein the PSCCH time-frequency resource comprises the PSCCH time domain resource and the PSCCH frequency domain resource.

2. The method according to claim 1, wherein determining, by the first terminal apparatus, the PSCCH frequency domain resource based on the resource pool configuration information and the format of control information further comprises:

in response to the PSCCH time domain resource comprising three consecutive symbols, and the content comprised in the control information corresponding to the format of the control information being greater than or greater than or equal to 80 bits and less than or less than or equal to 95 bits, determining that the PSCCH frequency domain resource is frequency domain bandwidth corresponding to 12 RBs.

3. The method according to claim 1, wherein determining, by the first terminal apparatus, the PSCCH frequency domain resource based on the resource pool configuration information and the format of control information further comprises:

in response to the PSCCH time domain resource comprising two consecutive symbols, and the content comprised in the control information corresponding to the format of the control information being greater than or greater than or equal to 50 bits and less than or less than or equal to 60 bits, determining that the PSCCH frequency domain resource is frequency domain bandwidth corresponding to 12 RBs.

4. The method according to claim 1, wherein determining, by the first terminal apparatus, the PSCCH frequency domain resource based on the resource pool configuration information and the format of control information further comprises:

in response to the PSCCH time domain resource comprising all symbols that are in one slot and that are used for sidelink communication, and the content comprised in the control information corresponding to the format of the control information being greater than or greater than or equal to 50 bits and less than or less than or equal to 60 bits, determining that the PSCCH frequency domain resource is frequency domain bandwidth corresponding to two RBs.

5. The method according to claim 1, wherein the resource pool configuration information is received from a network device or is preconfigured.

6. The method according to claim 1, wherein determining, by the first terminal apparatus, the PSCCH frequency domain resource based on the resource pool configuration information and the format of control information further comprises:

in response to the PSCCH time domain resource comprising three consecutive symbols, and the content comprised in the control information corresponding to the format of the control information being greater than or greater than or equal to 110 bits and less than or less than or equal to 125 bits, determining that the PSCCH frequency domain resource is frequency domain bandwidth corresponding to 18 RBs;

in response to the PSCCH time domain resource comprising two consecutive symbols, and the content comprised in the control information corresponding to the format of the control information being greater than or greater than or equal to 80 bits and less than or less than or equal to 95 bits, determining that the PSCCH frequency domain resource is frequency domain bandwidth corresponding to 18 RBs;

in response to the PSCCH time domain resource comprising two consecutive symbols, and the content comprised in the control information corresponding to the format of the control information being greater than or greater than or equal to 110 bits and less than or less than or equal to 125 bits, determining that the PSCCH frequency domain resource is frequency domain bandwidth corresponding to 26 RBs;

in response to the PSCCH time domain resource comprising all symbols that are in one slot and that are used for sidelink communication, and the content comprised in the control information corresponding to the format of the control information being greater than or greater than or equal to 50 bits and less than or less than or equal to 60 bits, determining that the PSCCH frequency domain resource is frequency domain bandwidth corresponding to two RBs;

in response to the PSCCH time domain resource comprising all symbols that are in one slot and that are used for sidelink communication, and the content comprised in the control information corresponding to the format of the control information being greater than or greater than or equal to 80 bits and less than or less than or equal to 95 bits, determining that the PSCCH frequency domain resource is frequency domain bandwidth corresponding to three RBs; or in response to the PSCCH time domain resource comprising all symbols that are in one slot and that are used for sidelink communication, and the content comprised in the control information corresponding to the format of the control information being greater than or greater than or equal to 110 bits and less than or less than or equal to 125 bits, determining that the PSCCH frequency domain resource is frequency domain bandwidth corresponding to five RBs.

7. A communication method, comprising:

obtaining, by a second terminal apparatus, resource pool configuration information, wherein the resource pool configuration information comprises information about a physical sidelink control channel (PSCCH) time domain resource;

determining, by the second terminal apparatus, a first PSCCH frequency domain resource;

receiving, by the second terminal apparatus, control information from a first terminal apparatus on a first PSCCH time-frequency resource, wherein a format of the control information corresponds to a size of content comprised in the control information, the first PSCCH time-frequency resource comprises the PSCCH time domain resource and the first PSCCH frequency domain resource;

in response to the second terminal apparatus not receiving the control information from the first terminal apparatus on the first PSCCH time-frequency resource, determining, by the second terminal apparatus, a second PSCCH frequency domain resource; and receiving, by the second terminal apparatus, the control information from the first terminal apparatus on a second PSCCH time-frequency resource, wherein the second PSCCH time-frequency resource comprises the PSCCH time domain resource and the second PSCCH frequency domain resource, and wherein the PSCCH time domain resource and the second PSCCH frequency domain resource are organized in manners comprising:

the PSCCH time domain resource comprises three consecutive symbols, the first PSCCH frequency domain resource is frequency domain bandwidth corresponding to eight RBs, and the second PSCCH frequency domain resource is frequency domain bandwidth corresponding to 12 RBs or 18 RBs.

8. The method according to claim 7, wherein the PSCCH time domain resource and the second PSCCH frequency domain resource are organized in the manners further comprising:

the PSCCH time domain resource comprises three consecutive symbols, the first PSCCH frequency domain resource is frequency domain bandwidth corresponding to 12 RBs, and the second PSCCH frequency domain resource is frequency domain bandwidth corresponding to eight RBs or 18 RBs; or the PSCCH time domain resource comprises three consecutive symbols, the first PSCCH frequency domain resource is frequency domain bandwidth corresponding to 18 RBs, and the second PSCCH frequency domain resource is frequency domain bandwidth corresponding to eight RBs or 12 RBs.

9. The method according to claim 7, wherein the PSCCH time domain resource and the second PSCCH frequency domain resource are organized in the manners further comprising:

the PSCCH time domain resource comprises two consecutive symbols, the first PSCCH frequency domain resource is frequency domain bandwidth corresponding to 12 RBs, and the second PSCCH frequency domain resource is frequency domain bandwidth corresponding to 18 RBs or 26 RBs;

the PSCCH time domain resource comprises two consecutive symbols, the first PSCCH frequency domain resource is frequency domain bandwidth corresponding to 18 RBs, and the second PSCCH frequency domain resource is frequency domain bandwidth corresponding to 12 RBs or 26 RBs; or the PSCCH time domain resource comprises two consecutive symbols, the first PSCCH frequency domain resource is frequency domain bandwidth corresponding to 26 RBs, and the second PSCCH frequency domain resource is frequency domain bandwidth corresponding to 12 RBs or 18 RBs.

10. The method according to claim 7, wherein the PSCCH time domain resource and the second PSCCH frequency domain resource are organized in the manners further comprising:

the PSCCH time domain resource comprises all symbols that are in one slot and that can be used for sidelink communication, the first PSCCH frequency domain resource is frequency domain bandwidth corresponding to two RBs, and the second PSCCH frequency domain resource is frequency domain bandwidth corresponding to three RBs or five RBs;

the PSCCH time domain resource comprises all symbols that are in one slot and that can be used for sidelink communication, the first PSCCH frequency domain resource is frequency domain bandwidth corresponding to three RBs, and the second PSCCH frequency domain resource is frequency domain bandwidth corresponding to two RBs or five RBs; or the PSCCH time domain resource comprises all symbols that are in one slot and that can be used for sidelink communication, the first PSCCH frequency domain resource is frequency domain bandwidth corresponding to five RBs, and the second PSCCH frequency domain resource is frequency domain bandwidth corresponding to two RBs or three RBs.

11. The method according to claim 7, wherein the resource pool configuration information is received from a network device or is preconfigured.

12. An apparatus, comprising:
one or more memories comprising instructions; and
one or more processors in communication with the one or more memories, wherein an execution of the instructions by the one or more processors causes the apparatus to:
    obtain resource pool configuration information, wherein the resource pool configuration information comprises information about a physical sidelink control channel (PSCCH) time domain resource;
    determine a PSCCH frequency domain resource based on the resource pool configuration information and a format of control information; and
    send the control information to a second terminal apparatus, wherein the control information is carried on a PSCCH time-frequency resource, and wherein the PSCCH time-frequency resource comprises the PSCCH time domain resource and the PSCCH frequency domain resource,
    wherein, in response to the PSCCH time domain resource comprising three consecutive symbols, and the content comprised in the control information corresponding to the format of the control information being greater than or greater than or equal to 50 bits and less than or less than or equal to 60 bits, the execution of the instructions by the one or more processors causes the apparatus to determine that the PSCCH frequency domain resource is frequency domain bandwidth corresponding to eight resource blocks (RBs).

13. The apparatus according to claim 12, wherein:
in response to the PSCCH time domain resource comprising three consecutive symbols, and the content comprised in the control information corresponding to the format of the control information being greater than or greater than or equal to 80 bits and less than or less than or equal to 95 bits,
the execution of the instructions by the one or more processors causes the apparatus to determine that the PSCCH frequency domain resource is frequency domain bandwidth corresponding to 12 RBs.

14. The apparatus according to claim 12, wherein:
in response to the PSCCH time domain resource comprising two consecutive symbols, and the content comprised in the control information corresponding to the format of the control information being greater than or greater than or equal to 50 bits and less than or less than or equal to 60 bits,
the execution of the instructions by the one or more processors causes the apparatus to determine that the PSCCH frequency domain resource is frequency domain bandwidth corresponding to 12 RBs.

15. The apparatus according to claim 12, wherein:
in response to the PSCCH time domain resource comprising all symbols that are in one slot and that are used for sidelink communication, and the content comprised in the control information corresponding to the format of the control information being greater than or greater than or equal to 50 bits and less than or less than or equal to 60 bits,
the execution of the instructions by the one or more processors causes the apparatus to determine that the PSCCH frequency domain resource is frequency domain bandwidth corresponding to two RBs.

16. The apparatus according to claim 12, wherein:
in response to the PSCCH time domain resource comprising three consecutive symbols, and the content comprised in the control information corresponding to the format of the control information being greater than or greater than or equal to 110 bits and less than or less than or equal to 125 bits, the execution of the instructions by the one or more processors causes the apparatus to determine that the PSCCH frequency domain resource is frequency domain bandwidth corresponding to 18 RBs;

in response to the PSCCH time domain resource comprising two consecutive symbols, and the content comprised in the control information corresponding to the format of the control information being greater than or greater than or equal to 80 bits and less than or less than or equal to 95 bits, the execution of the instructions by the one or more processors causes the apparatus to determine that the PSCCH frequency domain resource is frequency domain bandwidth corresponding to 18 RBs;

in response to the PSCCH time domain resource comprising two consecutive symbols, and the content comprised in the control information corresponding to the format of the control information being greater than or greater than or equal to 110 bits and less than or less than or equal to 125 bits, the execution of the instructions by the one or more processors causes the apparatus to determine that the PSCCH frequency domain resource is frequency domain bandwidth corresponding to 26 RBs;

in response to the PSCCH time domain resource comprising all symbols that are in one slot and that are used for sidelink communication, and the content comprised in the control information corresponding to the format of the control information being greater than or greater than or equal to 50 bits and less than or less than or equal to 60 bits, the execution of the instructions by the one or more processors causes the apparatus to determine that the PSCCH frequency domain resource is frequency domain bandwidth corresponding to two RBs;

in response to the PSCCH time domain resource comprising all symbols that are in one slot and that are used for sidelink communication, and the content comprised in the control information corresponding to the format of the control information being greater than or greater than or equal to 80 bits and less than or less than or equal to 95 bits, the execution of the instructions by the one or more processors causes the apparatus to determine that the PSCCH frequency domain resource is frequency domain bandwidth corresponding to three RBs; or in response to the PSCCH time domain resource comprising all symbols that are in one slot and that are used for sidelink communication, and the content comprised in the control information corresponding to the format of the control information being greater than or greater than or equal to 110 bits and less than or less than or equal to 125 bits, the execution of the instructions by the one or more processors causes the apparatus to determine that the PSCCH frequency domain resource is frequency domain bandwidth corresponding to five RBs.

17. An apparatus, comprising:
one or more memories comprising instructions; and
one or more processors in communication with the one or more memories, wherein an execution of the instructions by the one or more processors causes the apparatus to:

obtain resource pool configuration information, wherein the resource pool configuration information comprises information about a physical sidelink control channel (PSCCH) time domain resource;

determine a first PSCCH frequency domain resource; and receive control information from a first terminal apparatus on a first PSCCH time-frequency resource, wherein a format of the control information corresponds to a size of content comprised in the control information, the first PSCCH time-frequency resource comprises the PSCCH time domain resource and the first PSCCH frequency domain resource;

in response to not receiving the control information from the first terminal apparatus on the first PSCCH time-frequency resource, determine a second PSCCH frequency domain resource; and receive the control information from the first terminal apparatus on a second PSCCH time-frequency resource, wherein the second PSCCH time-frequency resource comprises the PSCCH time domain resource and the second PSCCH frequency domain resource, and wherein the PSCCH time domain resource and the second PSCCH frequency domain resource are organized in manners comprising:

the PSCCH time domain resource comprises three consecutive symbols, the first PSCCH frequency domain resource is frequency domain bandwidth corresponding to eight RBs, and the second PSCCH frequency domain resource is frequency domain bandwidth corresponding to 12 RBs or 18 RBs.

18. The apparatus according to claim 17, wherein the PSCCH time domain resource and the second PSCCH frequency domain resource are organized in the manners further comprising:

the PSCCH time domain resource comprises three consecutive symbols, the first PSCCH frequency domain resource is frequency domain bandwidth corresponding to 12 RBs, and the second PSCCH frequency domain resource is frequency domain bandwidth corresponding to eight RBs or 18 RBs; or the PSCCH time domain resource comprises three consecutive symbols, the first PSCCH frequency domain resource is frequency domain bandwidth corresponding to 18 RBs, and the second PSCCH frequency domain resource is frequency domain bandwidth corresponding to eight RBs or 12 RBs.

19. The apparatus according to claim 17, wherein the PSCCH time domain resource and the second PSCCH frequency domain resource are organized in the manners further comprising:

the PSCCH time domain resource comprises two consecutive symbols, the first PSCCH frequency domain resource is frequency domain bandwidth corresponding to 12 RBs, and the second PSCCH frequency domain resource is frequency domain bandwidth corresponding to 18 RBs or 26 RBs;

the PSCCH time domain resource comprises two consecutive symbols, the first PSCCH frequency domain resource is frequency domain bandwidth corresponding to 18 RBs, and the second PSCCH frequency domain resource is frequency domain bandwidth corresponding to 12 RBs or 26 RBs; or the PSCCH time domain resource comprises two consecutive symbols, the first PSCCH frequency domain resource is frequency domain bandwidth corresponding to 26 RBs, and the second PSCCH frequency domain resource is frequency domain bandwidth corresponding to 12 RBs or 18 RBs.

20. The apparatus according to claim 17, wherein the PSCCH time domain resource and the second PSCCH frequency domain resource are organized in the manners further comprising:

the PSCCH time domain resource comprises all symbols that are in one slot and that can be used for sidelink communication, the first PSCCH frequency domain resource is frequency domain bandwidth corresponding to two RBs, and the second PSCCH frequency domain resource is frequency domain bandwidth corresponding to three RBs or five RBs;

the PSCCH time domain resource comprises all symbols that are in one slot and that can be used for sidelink communication, the first PSCCH frequency domain resource is frequency domain bandwidth corresponding to three RBs, and the second PSCCH frequency domain resource is frequency domain bandwidth corresponding to two RBs or five RBs; or the PSCCH time domain resource comprises all symbols that are in one slot and that can be used for sidelink communication, the first PSCCH frequency domain resource is frequency domain bandwidth corresponding to five RBs, and the second PSCCH frequency domain resource is frequency domain bandwidth corresponding to two RBs or three RBs.

\* \* \* \* \*